United States Patent [19]
Ngai

[11] Patent Number: 5,121,488
[45] Date of Patent: Jun. 9, 1992

[54] SEQUENCE CONTROLLER OF AN INSTRUCTION PROCESSING UNIT FOR PLACING SAID UNIT IN A READY, GO, HOLD, OR CANCEL STATE

[75] Inventor: Agnes Y. Ngai, Endwell, N.Y.

[73] Assignee: International Business Machines Corporation, Armonk, N.Y.

[21] Appl. No.: 569,381

[22] Filed: Aug. 14, 1990

Related U.S. Application Data

[63] Continuation of Ser. No. 444,271, Dec. 1, 1989, abandoned, which is a continuation of Ser. No. 873,731, Jun. 12, 1986, abandoned.

[51] Int. Cl.$^5$ .............................................. G06F 9/00
[52] U.S. Cl. ................................................ 395/375
[58] Field of Search ................. 364/200, 900; 395/375

[56] References Cited

U.S. PATENT DOCUMENTS

| | | | |
|---|---|---|---|
| 3,943,494 | 3/1976 | Holmes, Jr. et al. | 364/200 |
| 4,155,120 | 5/1979 | Keefer et al. | 364/200 |
| 4,384,324 | 5/1983 | Kim et al. | 364/200 |
| 4,532,589 | 7/1985 | Shintani et al. | 364/200 |
| 4,574,348 | 3/1986 | Scallon | 364/200 |
| 4,590,554 | 5/1986 | Glazer et al. | 371/11 X |
| 4,594,655 | 6/1986 | Hao et al. | 364/900 X |

FOREIGN PATENT DOCUMENTS 2159309A 11/1985 United Kingdom .

OTHER PUBLICATIONS

Sriui V. P., "A Fault Tolerant Dataflow System," IEEE Computer, Mar. 1985, pp. 54–68.
European Search Report dated Jan. 17, 1991, EPO Form 1507 07.90 Communication.
Architectural Advances Spur 32-Bit Micros, by John Bond, Computer Design, Jun. 1, 1984, pp. 125–136.
The Architecture of Pipelined Computers, by Peter M. Kogge, 1981, pp. 225–246.

*Primary Examiner*—David L. Clark
*Attorney, Agent, or Firm*—Baker, Maxham, Jester & Meador

[57] ABSTRACT

A sequence controller of an instruction processing unit (IPU) in a data processing system places the IPU is either a ready, go, hold-on-old, hold-on-new, or cancel state. If the IPU is ready to execute another instruction, the sequence controller places the IPU in the ready state. When an instruction is received for execution, and execution commences, the sequence controller places the IPU in the GO state. If at least one or more operands associated with the execution of an instruction are not ready when execution is scheduled to commence, the sequence controller places the IPU in a hold-on-new state, holding the pendency of the execution of the particular instruction, until the operands are available. If one or more other functional units in the data processing system are not ready (busy) during execution of the instruction, and the other functional units are needed to complete execution of the instruction, the sequence controller places the IPU in a hold-on-old state, holding the execution results thus far generated, until the functional units become availabale. If the functional unit remains busy, or if an error in the functional unit is confirmed, the sequence controller places the IPU in the cancel state. If the functional unit recovers from the error, and/or the functional unit is no longer busy, the sequence controller causes the IPU to leave the hold-on-old state, and the execution of the instruction is completed. When the one operand becomes available, the sequence controller causes the IPU to leave the hold-on-new state, and the execution of the instruction is completed.

5 Claims, 9 Drawing Sheets

SEQUENCE CONTROLLER OF AN INSTRUCTION PROCESSING UNIT FOR PLACING SAID UNIT IN A READY, GO, HOLD, OR CANCEL STATE

This is a continuation of application Ser. No. 07/444,271 filed Dec. 1, 1989.

BACKGROUND OF THE INVENTION

1. Field of the Invention

The subject invention relates to computer systems, and more particularly, to a sequence controller of an instruction processing unit (IPU) for placing the IPU in a ready, go, hold-on-new, hold-on-old, or cancel state depending upon the existence or status of certain conditions which were created during the execution of prior instructions.

2. Description of the Prior Art

Sequence control is an important consideration when designing a data processing system. This is especially true in a bus structured system. A bus structured system is composed of a number of functional units, each unit being responsible for a dedicated function. Each unit operates independently of one another If a data processing system requires that an operation be performed by two or more of the functional units, the system may perform the operation serially, or the system may perform the operation in parallel.

Using the serial approach, when a first sub-operation is completed by one of the two functional units, a second sub-operation commences by the other of the two functional units until the operation is complete.

Using the parallel approach, each free unit (ones which are not busy with another operation), among the two or more functional units involved in the operation, performs whatever steps it can in the operation, without the assistance of the other functional units, and subsequently completes the operation when the other functional units become available.

In the data processing system, a sequence controller is responsible for implementing either the serial approach or the parallel approach to performing the operation. If the sequence controller implements the serial approach, a longer period of time elapses during the performance of the operation than would be the case if the sequence controller implemented the parallel approach For example, if a processor in a data processing system is ready to execute an instruction which requires the use of two operands, and only one operand is available, using the serial approach, the processor must leave its "ready" state, with respect to the execution of such instruction, and stand ready to execute another instruction; or, if another functional unit is required in order to execute the instruction, and the other functional unit is busy when the execution of the instruction is scheduled to commence, using the serial approach, the processor must leave its "ready" state, with respect to execution of such instruction, and stand ready to execute another instruction if needed However, using the parallel approach, the processor need not leave its "ready" state, with respect to execution of such instruction, rather, it holds its preliminary results in storage until the other operand is available or until the other functional unit is no longer busy. Therefore, the performance of a data processing system, utilizing the serial approach to processing, is inferior to the performance of a data processing system which utilizes the parallel approach to processing.

SUMMARY OF THE INVENTION

Accordingly, it is a primary object of the present invention to provide a sequence controller for an instruction processing unit (IPU) of a data processing system which utilizes the parallel approach to processing rather than the serial approach to processing.

It is another object of the present invention to provide a sequence controller for an instruction processing unit (IPU) which utilizes the parallel approach to processing by directing a plurality of other functional units to perform a corresponding plurality of operations in parallel rather than serially.

It is another object of the present invention to provide a sequence controller for an instruction processing unit (IPU) which utilizes the parallel approach to processing by placing the IPU in either a READY, GO, HOLD ON NEW, HOLD ON OLD, or CANCEL state, depending upon the status of the other functional units within the data processing system or the availability of an operand needed for completion of an operation by the data processing system.

These and other objects of the present invention are accomplished by providing a sequence controller in an instruction processing unit (IPU) of a data processing system which places the IPU in a "hold-on-new" state if at least one of the operands associated with an operation to be performed is not ready and available when the operation is to be performed and which places the IPU in a "hold-on-old" state if at least one of the plurality of other functional units needed to perform the operation is busy with another operation. If the functional unit remains busy, and an error in the unit is confirmed, the operation is cancelled. If the unit recovers from the error, and/or if the functional unit is no longer busy, the processing portion of the data processing system leaves the "Hold on Old" state and the operation is completed. When the one operand becomes available, the processing portion of the data processing system leaves the "hold-on-new" state and completes the operation.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein

FIG. 4 and 4A-4E illustrate a detailed circuit construction of the sequence controller, a portion of the processor controller of FIG. 3.

DETAILED DESCRIPTION OF THE PREFERRED EMBODIMENT

In the following description, in addition to a discussion of the present invention, areas considered peripheral to that of the present invention will also be discussed. A complete and thorough discussion of the areas considered peripheral to that of the present invention may be found in a technical manual entitled "IBM System/370 Principles of Operation", manual number GA22-7000, which manual is available from IBM Corporation, the disclosure of which is incorporated by reference into the specification of this application.

Figure 1:
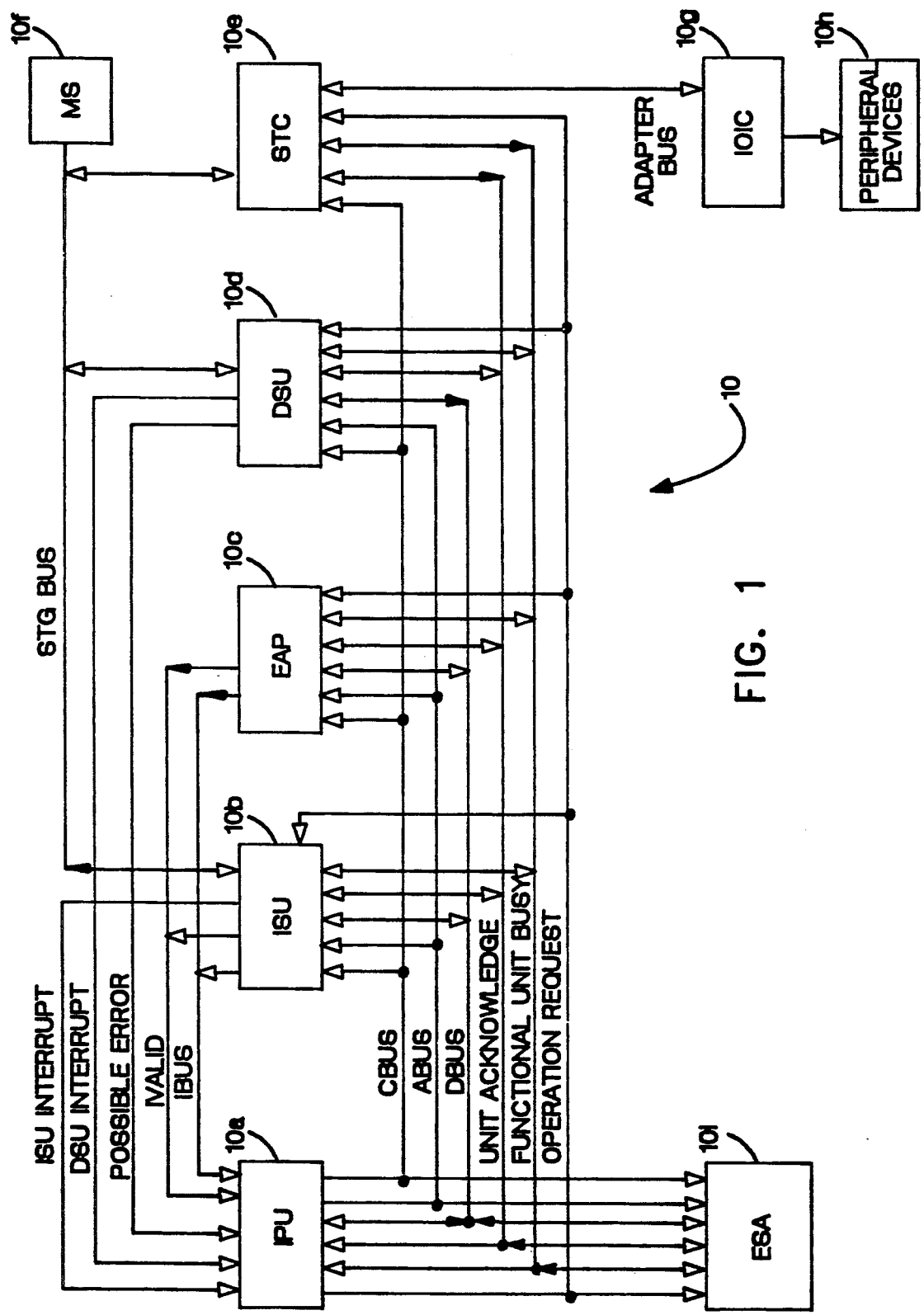
FIG. 1 illustrates a system block diagram of a typical data processing system, including an Instruction Processing Unit (IPU), which implements the parallel processing approach.

Referring to FIG. 1, a system block diagram of a pipelined data processing system 10 is illustrated. In the following description, the term "functional units" refers to the other units of FIG. 1 in addition to the IPU, namely, the ISU, the EAP, the DSU, the ESA, and the STC.

In FIG. 1, an instruction processing unit (IPU) 10a is illustrated. The IPU 10a performs various operations as specified in a particular instruction being executed. It issues requests to various other functional units within the data processing system, as needed in response to the execution of the instruction, and, following the issuance of requests to the other functional units, coordinates the operation sequence of such functional units. An instruction storage unit (ISU) 10b is connected to the IPU 10a via an Ibus, a Cbus, an Abus, a Dbus, a UNIT ACKNOWLEDGE line, a FUNCTIONAL UNIT BUSY line, an OPERATION REQUEST line, an INSTRUCTION VALID (I valid) line and an ISU INTERRUPT line. The ISU 10b fetches, prefetches, and delivers instructions to the IPU 10a. It also supports logical address translation. An emulator assist processor (EAP) 10c is connected to the ISU 10b and the IPU 10a via the Cbus, the Abus, the Dbus, the UNIT ACKNOWLEDGE line, the FUNCTIONAL UNIT BUSY line, the OPERATION REQUEST line, the Ibus, and the I valid line The EAP 10c converts IBM/370 instructions into a separate group of lower level instructions. A data storage unit (DSU) 10d is connected to the ISU 10b via a storage bus (stg bus); to the IPU 10a via a DSU INTERRUPT (ERROR) line and a POSSIBLE ERROR line; to the EAP 10c, the ISU 10b, and the IPU 10a via the Cbus, the Abus, the Dbus, the FUNCTIONAL UNIT BUSY line, the UNIT ACKNOWLEDGE line, and the OPERATION REQUEST line. The DSU 10d reads and writes data operands into the cache of the IPU 10a, and supports address translation, address checking, and storage protection. The main storage controller (STC) 10e is connected to the DSU 10d and to the ISU 10b via the STG bus, to the DSU, EAP, ISU, and IPU via the Cbus, and to the DSU, EAP, ISU, and IPU via the FUNCTIONAL UNIT BUSY line, UNIT ACKNOWLEDGE, OPERATION REQUEST line. The STC 10e is also connected to an input/output interface controller (IOIC) 10g via an adapter bus and to a main storage (MS) 10f. The IOIC 10g is connected to various peripheral devices 10h. The STC 10e prioritizes the main store usage, and serves as an adapter between the IOIC 10g and the main store (MS) 10f. An engineering scientific accelerator (ESA) 10i is connected to the IPU 10a; and to the ISU 10b, the EAP 10c, and the DSU 10d via the Cbus, the Abus, the Dbus, the UNIT ACKNOWLEDGE, FUNCTIONAL UNIT BUSY, and OPERATION REQUEST lines; and to the STC 10e via the Cbus, the UNIT ACKNOWLEDGE, FUNCTIONAL UNIT BUSY, and OPERATION REQUEST lines. The ESA 10i is responsible for all floating point calculations as requested by the IPU 10a. The IPU, ISU, EAP, DSU, and STC are connected to one another by way of several internal buses and a number of interunit communication signal lines. The internal buses include the Abus, the Lbus, the Cbus, and the Ibus The major interunit communication signal lines are: the INSTRUCTION VALID, FUNCTIONAL UNIT BUSY, UNIT ACKNOWLEDGE, POSSIBLE ERROR, and DSU INTERRUPT (ERROR).

In FIG. 1, a typical system instruction is executed in a number of machine cycles. For example, an IBM/370 instruction is fetched from the DSU 10d. The 370 instruction is transformed into a microcoded routine or is converted into 1 or more lower level instructions by the EAP 10c. The microcoded routine is stored in the ISU 10b. This routine is decoded, executed, and managed by the IPU 10a. Operand data is fetched from or stored in the DSU 10d. All floating point operations are performed in the ESA 10i. Each microinstruction of the microcoded routine is categorized as either an internal operation or a processor operation. An internal operation microinstruction is completely executed by the IPU 10a, since it does not require any additional operations by any other functional units, such as the ISU, the EAP, the DSU, the STC, or the ESA. An example of such an internal operation microinstruction is a register to register ADD instruction. However, a processor operation microinstruction requires one or more functional units, in addition to the IPU 10a, to complete the instruction execution. Examples of such a processor operation microinstruction include a storage to register floating point operation, protection change, and reference bit implementation. The operation times required by each functional unit (including the IPU 10a) to complete its part of the operation are not the same. Each functional unit is able to start the next operation requested by the IPU 10a at the completion of its current operation. The IPU lines up the operation requests to the various functional units in the correct order. As a result, each unit operates independently of one another.

The subject invention is directed primarily to an improvement in the performance of the data processing system of FIG. 1 when such data processing system is executing a processor operation microinstruction, i.e, one which requires more than one functional unit to complete the execution of the microinstruction.

The IPU 10a executes instructions and gives out job orders, associated with the execution of certain microinstructions, to various functional units. During the execution of these instructions, a 22 sequence control, incorporated within the IPU 10a of FIG. 1, in accordance with the present invention, places the IPU 10a in one of the following states: READY, GO, HOLD ON NEW, HOLD ON OLD, or CANCEL. The definitions of each of these states are set forth in the following paragraphs.

READY means the IPU 10a is not engaged in the execution of any instruction and there is no abnormal condition in existence which would block the IPU from processing any instruction when one is available.

GO means a new instruction is available and there is no unusual condition in existence which should stop the IPU from executing the instruction.

HOLD ON NEW means that certain conditions, resulting from the execution of prior instructions, prevent the IPU from starting execution of a new instruction; for example, a required operand is not ready and available when the operation is to be performed. When these conditions disappear, the IPU may continue and begin execution of the new instruction.

HOLD ON OLD means that certain conditions, resulting from the execution of prior instructions, cause one or more of the other functional units (ISU, EAP, DSU, STC, EAP) to remain in a busy state. The next sequential instruction requires multiple units to complete execution of the instruction. The IPU may begin execution of the next sequential instruction, but must subsequently wait until the other required functional units are no longer busy before the operation may be completed.

CANCEL means the IPU is engaged in the execution of an instruction; however, some unpredictable condition occurs; as a result, the IPU cannot proceed in its execution; furthermore, it cannot continue execution of the current instruction even after the condition disappears.

The IPU 10a is placed in the above referenced states in response to various communication signals which are transmitted between the IPU 10a and the other functional units of FIG. 1. These communication signals were introduced with reference to FIG. 1 and include: INSTRUCTION VALID, FUNCTIONAL UNIT BUSY, ERROR, and POSSIBLE ERROR. These communications signals are defined in the following paragraphs.

INSTRUCTION VALID means an instruction, and its associated parameters, is valid and ready to be executed by the IPU 10a. An active INSTRUCTION VALID signal enables the IPU to proceed to the READY state and subsequently to the GO state. An inactive INSTRUCTION VALID signal indicates that there is no available instruction for the IPU to execute, therefore, the IPU leaves the GO state.

FUNCTIONAL UNIT BUSY means at least one of the functional units other than the IPU 10a is busy. The busy unit is currently involved in an operation and is unable to start a new operation when requested by the IPU. An active FUNCTIONAL UNIT BUSY signal in conjunction with an active OPERATION REQUEST signal causes the IPU to enter the HOLD ON OLD state.

ERROR means the functional unit (ISU, EAP, DSU, STC, or ESA) detected an abnormal condition and has aborted its operation. The ERROR signal is transmitted from the ISU 10b as an ISU INTERRUPT signal, and is transmitted from the DSU 10d as a DSU INTERRUPT signal.

POSSIBLE ERROR means the functional unit detected an error condition and is in the process of attempting to recover from the error condition.

In the case of the POSSIBLE ERROR signal, the functional unit may or may not be able to recover from the error condition. If the IPU 10a receives the ERROR signal (i.e., the ISU INTERRUPT or the DSU INTERRUPT signal), the IPU enters the CANCEL state If the IPU receives the POSSIBLE ERROR signal, it enters the CANCEL state only if it cannot recover from the error condition; however, it enters the READY state if it does recover from the error condition.

Prior to presenting a description of the functional operation of the embodiment of invention set forth in FIG. 1, it is necessary to describe the manner in which the FIG. 1 embodiment performs various overlap operations when executing one or more instructions. Therefore, the following paragraphs describe these overlap operations in the context of the following instructions: (1) the LSAR instruction; (2) the MFP instruction; (3) the BX instruction; and (4) the LUR instruction.

The LSAR instruction is the load storage access recording instruction. It is used to set the reference and change bits of the storage access recording mechanism. There is a set of reference and change bits allocated for every page in storage. This recording mechanism hardware is implemented in the STC 10e of FIG. 1. The following operations are needed to complete this instruction: (1) storage address calculation, (2) address validity checking, and (3) recording bits update. Each of these operations are performed by a different unit. The IPU 10a calculates the storage address. This address is checked for its validity by the DSU 10d. The recording bits are then updated by the STC 10e with the value delivered from the IPU 10a. Each of these units take one cycle to complete their required operation. Machine cycle time is also required to deliver information between units. The LSAR instruction takes six machine cycles to complete, as is indicated by the following sketch:

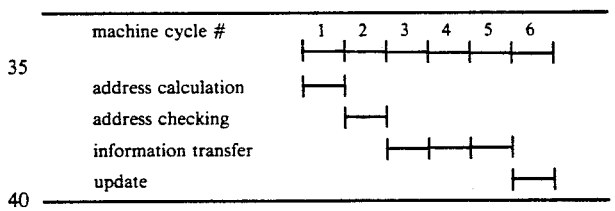

The IPU 10a is notified after the address checking is performed, and a new instruction may be started.

The MFP instruction is a hex floating point multiply instruction. The input operands are from two floating point registers and the multiplication result is stored in a third floating point register The operations required by this instruction are: (1) operation preparation, and (2) multiply operation. The instruction is decoded by the IPU 10a. All associated operation parameters are generated by the IPU 10a. The IPU 10a issues an operation request to the ESA 10i and the IPU 10a also delivers the parameters and floating register addresses to the ESA 10i. The ESA 10i performs the multiplication. The IPU 10a takes one cycle to perform its function and the ESA 10i takes five additional cycles to complete the MFP instruction, as indicated by the following sketch:

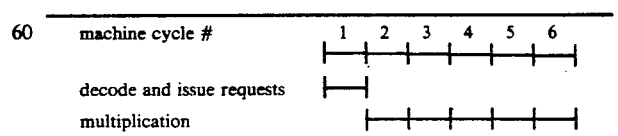

The ESA 10i performs exponent calculation and specification checks at the beginning of the operation and releases the IPU 10a.

The BX instruction is a branch with execute instruction. It is used to trap out of a sequential instruction stream. The instruction, after the branch instruction, is executed whether the branch is successful or not. This instruction requires two operations to complete (1) branch address calculation/branch testing, and (2) target instruction fetch. The branch address is calculated in the IPU 10a. The branch testing is also performed in the IPU. The storage address is delivered to the ISU 10b via the Abus of FIG. 1 The target instruction is fetched in the ISU 10b. The fetched instruction is returned to the IPU 10a via the Ibus. Each of these operations take one cycle to execute and the instruction takes two cycles to complete, as indicated by the following sketch:

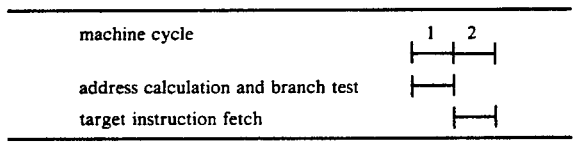

The ISU 10b can deliver the new instruction as early as the end of the second cycle into the instruction. The LUR instruction is the load relocated instruction. A constant, as specified in the instruction, is added to the content of a register. This instruction sets a hardware facility in the EAP 10c. The result of the calculation is delivered to the EAP 10c via the Abus. There are two operations required in this instruction: (1) operand calculation, and (2) hardware facility set in the EAP 10c. The operand calculation is performed in the IPU 10a. The calculation result is loaded into a hardware facility of the EAP 10c, as indicated in the following sketch:

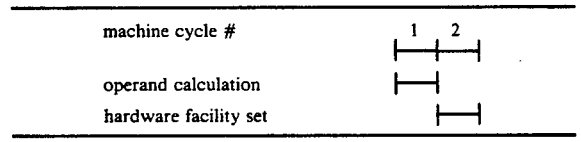

When the above referenced instructions are executed by the plurality of functional units of FIG. 1, the execution of the instructions are overlapped The following conservation chart illustrates the manner in which execution of the above referenced instructions are overlapped among the plurality of functional units (IPU 10a, ISU 10b, EAP 10c, DSU 10d, STC 10e, and ESA 10i) of FIG. 1:

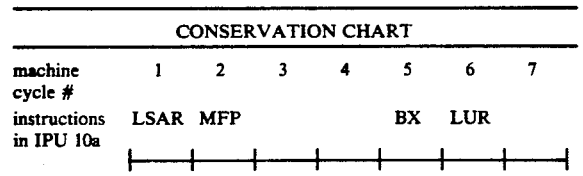

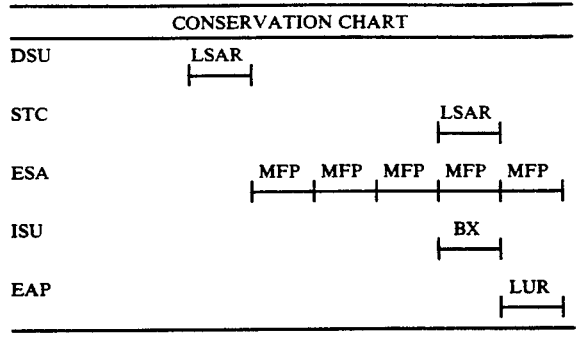

A functional description of the data processing system of FIG. 1, which implements the parallel processing approach of the present invention, will be described in the following paragraphs with reference to FIGS. 1 of the drawings and to the above referenced conservation chart.

In the conservation chart, and in FIG. 1, during machine cycle 1, the IPU 10a is assumed to be in the GO state. The IPU 10a is executing the LSAR instruction, and a storage address is calculated in the IPU. An operation request is issued from the IPU 10a to the DSU 10d. A response from the DSU 10d will not be available until the end of machine cycle 2. As far as the IPU is concerned, the IPU does not know whether the operation request was received by the DSU 10d. Instead of waiting for the response, the IPU 10a proceeds to process the next instruction, that is, the MFP instruction. The IPU 10a generates the MFP operation request along with its associated parameters. Based on the DSU's response to the LSAR operation request at the end of machine cycle 2, the IPU 10a determines which of the following states the IPU 10a should enter: READY, GO, HOLD ON OLD, HOLD ON NEW, and CANCEL. The DSU's response will be one of the following signals FUNCTIONAL UNIT BUSY, POSSIBLE ERROR, and DSU INTERRUPT (ERROR). The FUNCTIONAL UNIT BUSY signal or the POSSIBLE ERROR signal directs the IPU into the HOLD ON OLD state. As a result, the IPU 10a holds the results and information associated with execution of the MFP instruction. The DSU INTERRUPT (ERROR) signal from the DSU 10d indicates that problems, which are not correctable, resulted from execution of the LSAR instruction. As a result, the IPU 10a enters the CANCEL state and aborts the instruction stream. It is assumed that the DSU 10d responds with two signals the FUNCTIONAL UNIT BUSY signal and the POSSIBLE ERROR signal. This response from the DSU 10d causes the IPU 10a to enter the HOLD ON OLD state in machine cycle 3. From this point on, whenever the DSU 10d response changes, the IPU 10a will enter a new state corresponding to the new response. Assume that the DSU response changes at the end of machine cycle 3. As a result, the DSU 10d can respond with any one of the following conditions: (1) deactivate the FUNCTIONAL UNIT BUSY signal and the POSSIBLE ERROR signal, (2) deactivate the POSSIBLE ERROR signal, (3) deactivate the FUNCTIONAL UNIT BUSY signal, or (4) generate an ERROR signal. If the DSU 10d responds with the first condition (deactivate the FUNCTIONAL UNIT BUSY signal and the POSSIBLE ERROR signal), the IPU 10a leaves the HOLD ON OLD state and enters the GO state if the next instruction is available. If the DSU 10d responds with the second condition (deactivate the POSSIBLE ERROR signal), the IPU 10a enters the GO state and completes the next instruction by issuing an MFP operation request to the ESA 10i. However, the FUNCTIONAL UNIT BUSY signal is still active. The ESA has to respond with a UNIT ACKNOWLEDGE signal if it can process the MFP operation request. The UNIT ACKNOWLEDGE signal indicates that the operation request and associated parameters, issued by the IPU 10a, were received by the ESA 10i The IPU 10a has to wait for the UNIT ACKNOWLEDGE response from the ESA 10i As a result, the IPU 10a can complete the current instruction but is unable to begin execution of the next instruction in the instruction stream until the UNIT ACKNOWLEDGE response is received from the ESA. Therefore, the IPU 10a enters the HOLD ON NEW state. If the DSU 10d responds with the third condition (deactivate the FUNCTIONAL UNIT BUSY signal), the IPU 10a remains in the HOLD ON OLD state. If the DSU 10d responds with the fourth condition (generates an ERROR signal), which indicates that an abnormal condition has occurred, the IPU 10a enters the CANCEL state. Therefore, assuming that the DSU 10d deactivates the POSSIBLE ERROR signal at the end of machine cycle 3, the IPU 10a sequences to the HOLD ON NEW state during machine cycle 4. The ESA 10i must respond to the MFP instruction operation request by the end of machine cycle 4. The ESA may respond by transmitting the UNIT ACKNOWLEDGE signal to the IPU, or it may not respond. The UNIT ACKNOWLEDGE signal indicates that the ESA 10i has received an operation request and associated parameters from the IPU 10a via the OPERATION REQUEST line. When the IPU 10a receives the UNIT ACKNOWLEDGE signal, it may leave the HOLD ON NEW state and enter one of the following states: GO and READY. However, if the IPU 10a does not receive a response within an expected timing window, the IPU 10a will sequence to the CANCEL state. Therefore, assuming that the ESA 10i responds with the UNIT ACKNOWLEDGE signal within the expected timing window, and that the next instruction is available, the IPU 10a enters the GO state during machine cycle 5. During machine cycle 5, the IPU 10a executes the BX instruction. The IPU 10a issues an operation request to the ISU 10b via the OPERATION REQUEST line. This request causes the ISU 10b to fetch a branch target instruction. The ISU 10b can respond with one of the following signals: (1) INSTRUCTION VALID, (2) ISU INTERRUPT (ERROR), and (3) FUNCTIONAL UNIT BUSY (ISU BUSY) without INSTRUCTION VALID. The INSTRUCTION VALID signal means that the branch target instruction is fetched and is available to the IPU 10a. The ERROR signal means that an unusual condition has occurred in the ISU 10b and the branch target instruction is unavailable. The ISU BUSY signal, without an INSTRUCTION VALID signal, indicates that the requested information is not stored in the ISU 10a and it must be retrieved from the main store 10f. Loading data from the main store 10f takes several machine cycles. The number of cycles required depends on the machine cycle time and the type of main store implemented in a particular system. It is assumed that the ISU 10b responds with ISU BUSY without an active INSTRUCTION VALID signal. As a result, there are no more available instructions for the IPU 10a to execute. As a result, the IPU 10a enters the READY state. The IPU 10a remains in this state until an INSTRUCTION VALID signal is activated.

Figure 2:
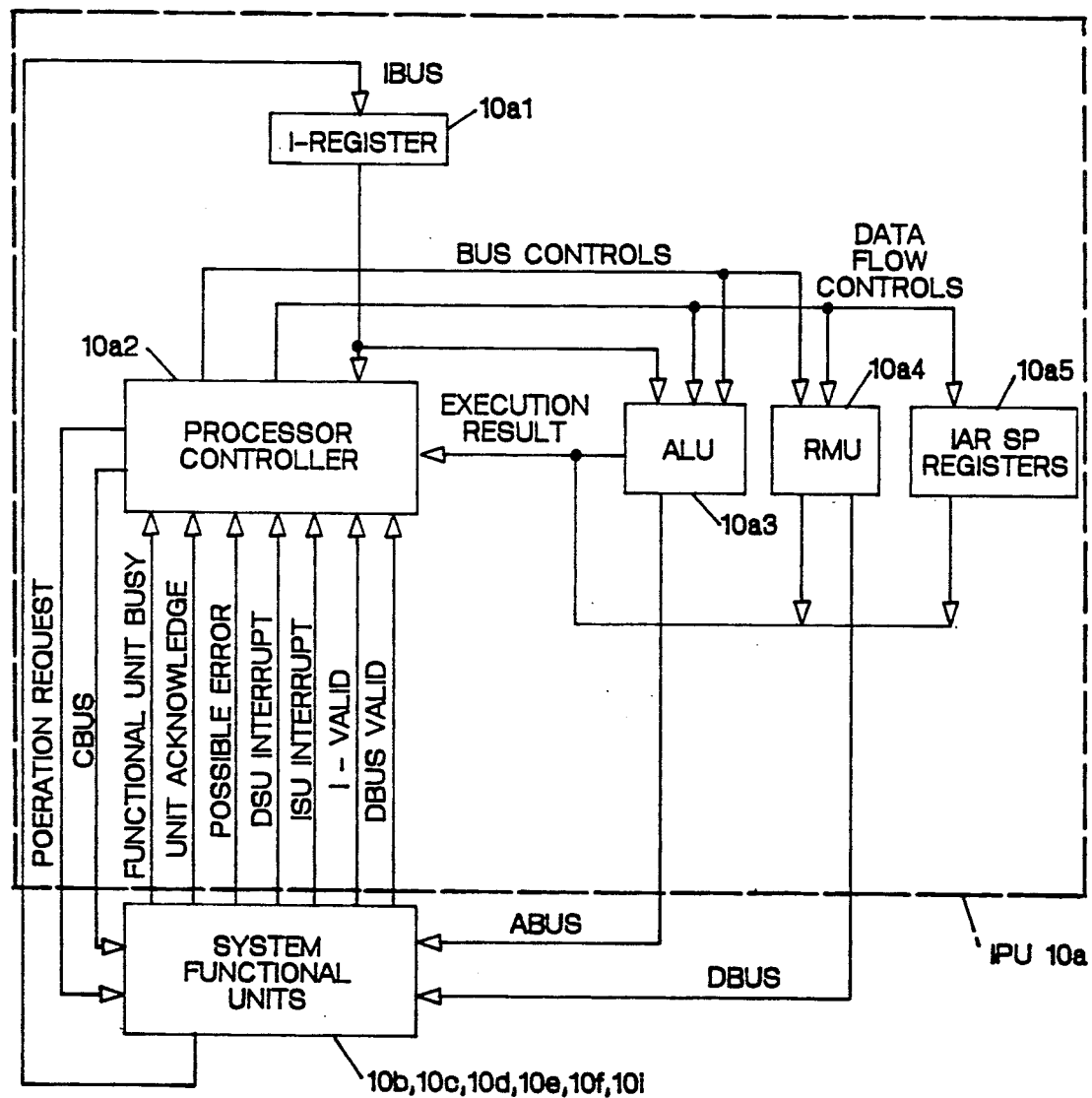
FIG. 2 illustrates a system block diagram of the instruction processor unit (IPU), a portion of the system block diagram of FIG. 1.

Referring to FIG. 2, a further construction of the Instruction Processing Unit (IPU) 10a of FIG. 1 is illustrated.

In FIG. 2, the IPU 10a comprises an instruction register (I-register) 10a1; a processor controller 10a2, connected to the I-register 10a1, and to the system functional units (which include the ISU 10b, the EAP 10c, the DSU 10d, and the STC 10e) via the DBUS VALID signal, the I-VALID signal, the ERROR signal which includes the ISU INTERRUPT and the DSU INTERRUPT, POSSIBLE ERROR, UNIT ACKNOWLEDGE, FUNCTIONAL UNIT BUSY, Cbus, and OPERATION REQUEST; an arithmetic logic unit (ALU) 10a3, connected to the processor controller 10a2 via an EXECUTION RESULT line, and to the processor controller 10a2 and the I-register 10a1 via a separate line; a rotate merge unit (RMU) 10a4 connected to the Dbus, connected to the processor controller 10a2 and to the ALU 10a3 via a line labelled "data flow controls", connected to the processor controller 10a2 and the ALU 10a3 via a line labelled "bus controls", and connected to the processor controller 10a2 via the EXECUTION RESULT line; an Instruction Address Register (IAR) and special purpose registers (SP registers) 10a5 connected to the RMU 10a4, the ALU 10a3, and the processor controller 10a2 via the "data flow controls" line, and connected to the processor controller 10a2 via the EXECUTION RESULT line.

Instructions are delivered to the processor controller 10a2 and to the ALU 10a3, from the system functional units, via the Ibus and the I-register 10a1. The processor controller examines the current status of all functional units, gathers information from previously started instructions, decodes the current instruction, and determines the sources of data operands and the operations required to complete the instruction. It transfers the result of the above analysis to the remainder of the IPU.

The ALU 10a3 contains a set of general purpose registers (GPR). When an instruction is received, input operands are fetched from the GPR. The ALU carries out all the arithmetic and logical operations at the same time.

The IAR 10a5 keeps track of the addresses of instructions within the pipeline in the processor controller 10a2. A new instruction starts every machine cycle in the GO state. This means that the IAR is updated every GO cycle and is unchanged in any other states except in the non-sequential execution cycles.

The special purpose registers (SP registers, or SPR) 10a5 contain information relating to the operating programs. The information includes the address of an instruction that caused an interrupt, the type of interrupt, the status of the machine at the time of interrupt. The operations involving the SPR are mainly load and copy. Load SPR means putting new data into the SPR 10a5 Copy SPR means reading the content of the SPR and storing the content into a specified location. For example, one such operation involves moving the contents of a SPR into another SPR.

The rotate merge unit (RMU) 10a4 performs operand shifting, operand rotation, and operand merging under the direction of the processor controller 10a2. The RMU 10a4 comprises a shifter, a merger, and a mask. The shifter shifts an input operand left, right, or wrap around The merger has two sets of input operands, A and B. The input data is merged together to form one set of output data, output data C. The input data is merged in accordance with the control of the mask. The mask is a string of 1's and 0's. Each bit of the mask controls how the input data is merged corresponding to each bit location in the merger. If the mask bit is 1, the corresponding data bit from input A is selected and becomes the output C. If the mask bit is 0, the corresponding data bit from input B is selected and becomes the output C.

Figure 3:
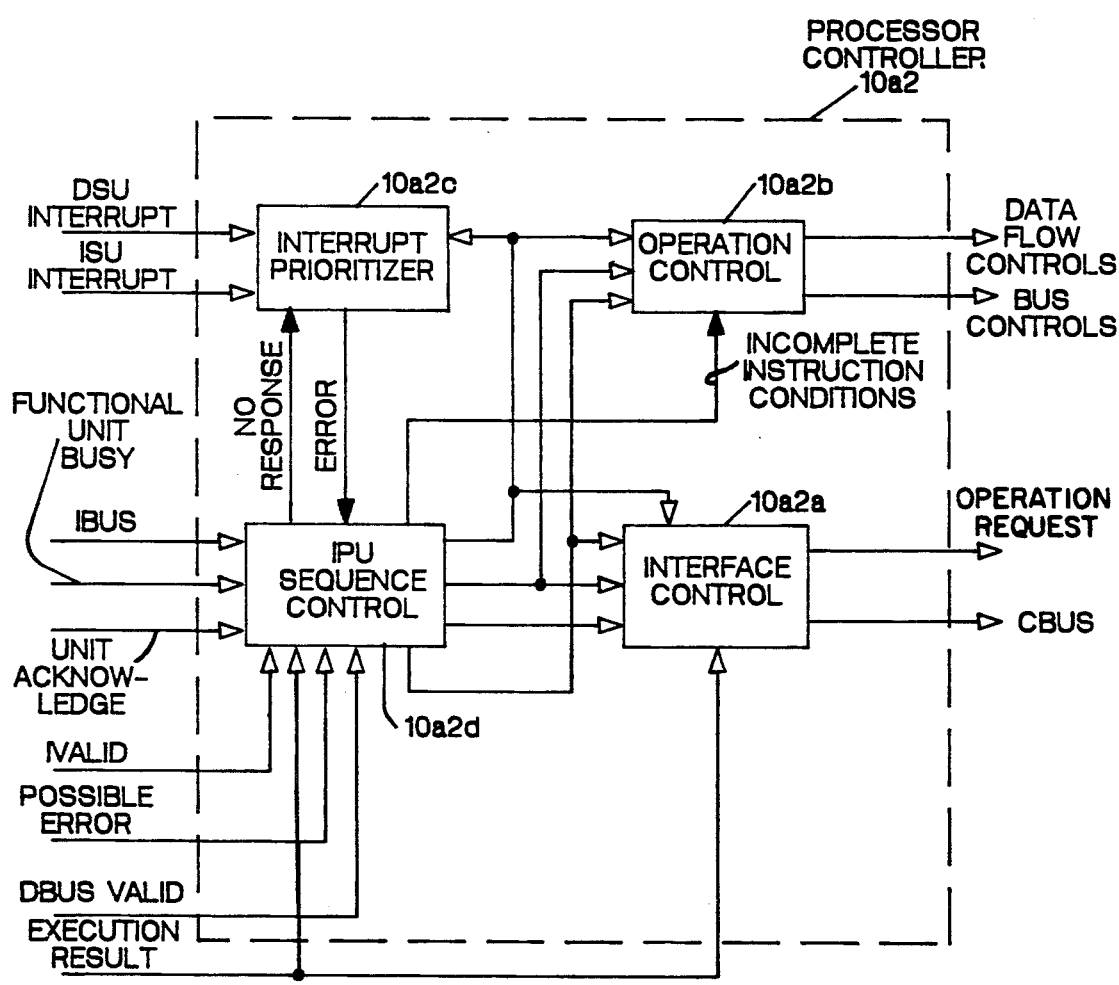
FIG. 3 illustrates a system block diagram of the processor controller, a portion of the IPU of FIG. 2.
Figure 4A:
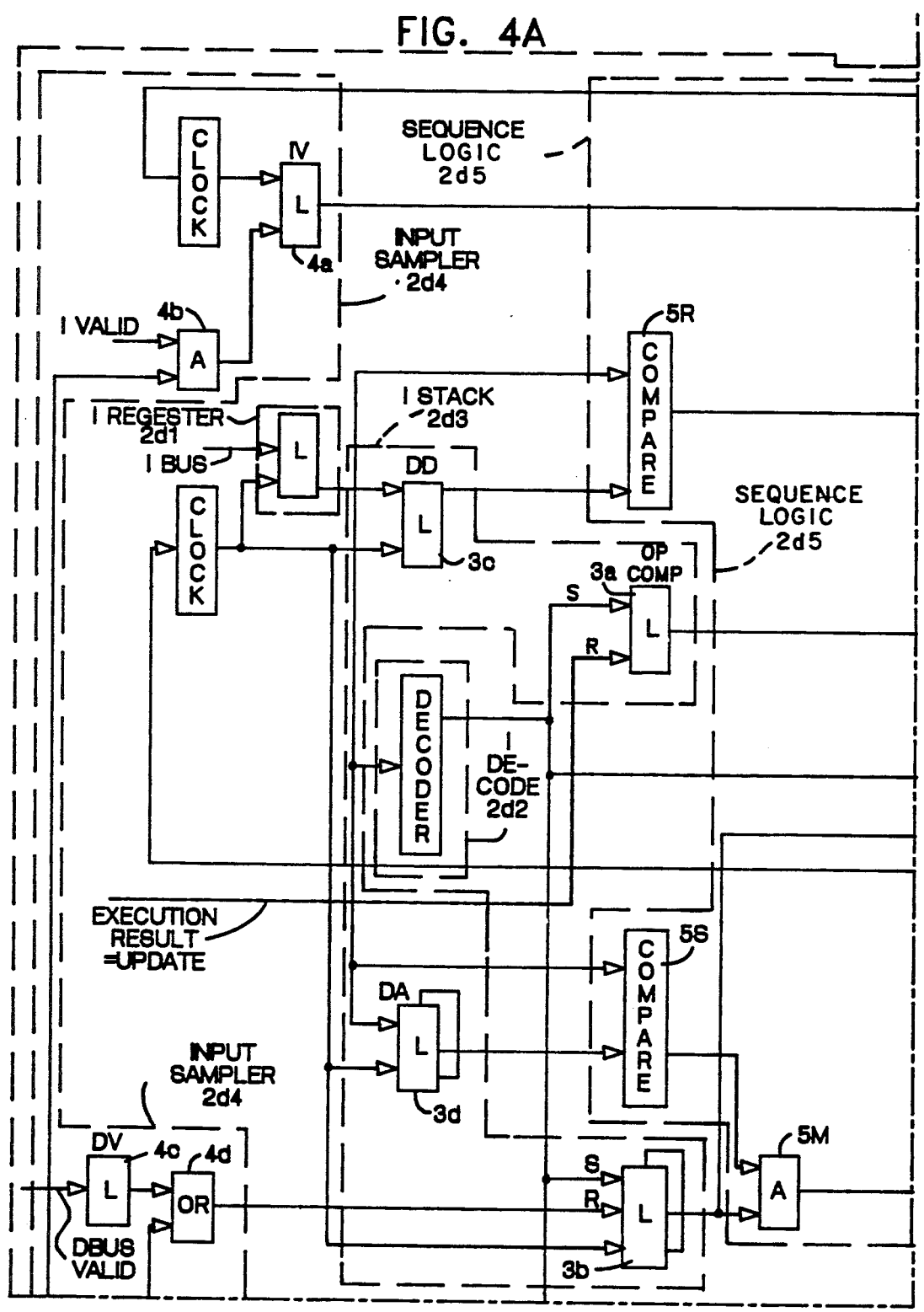
Figure 4B:
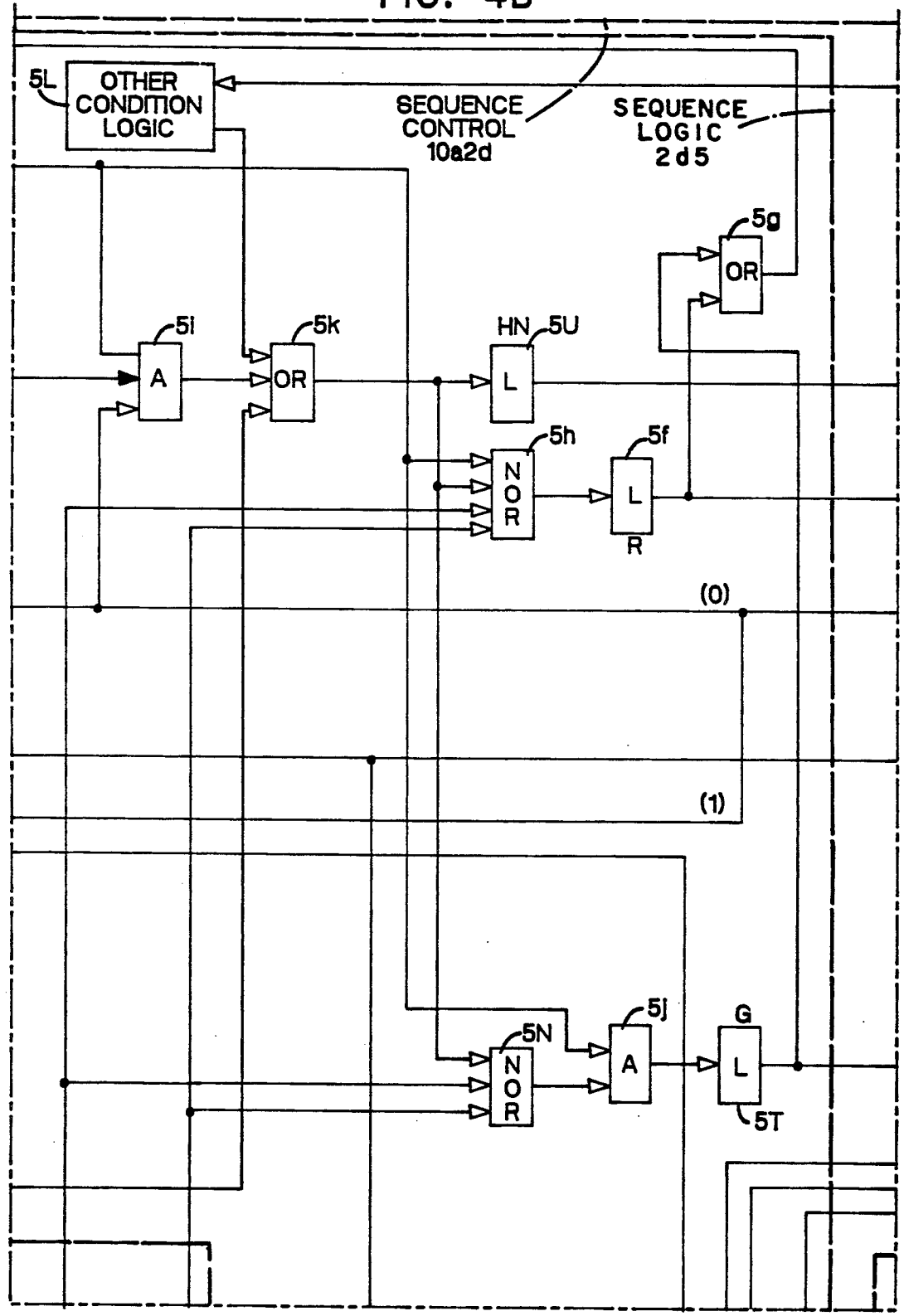
Figure 4C:
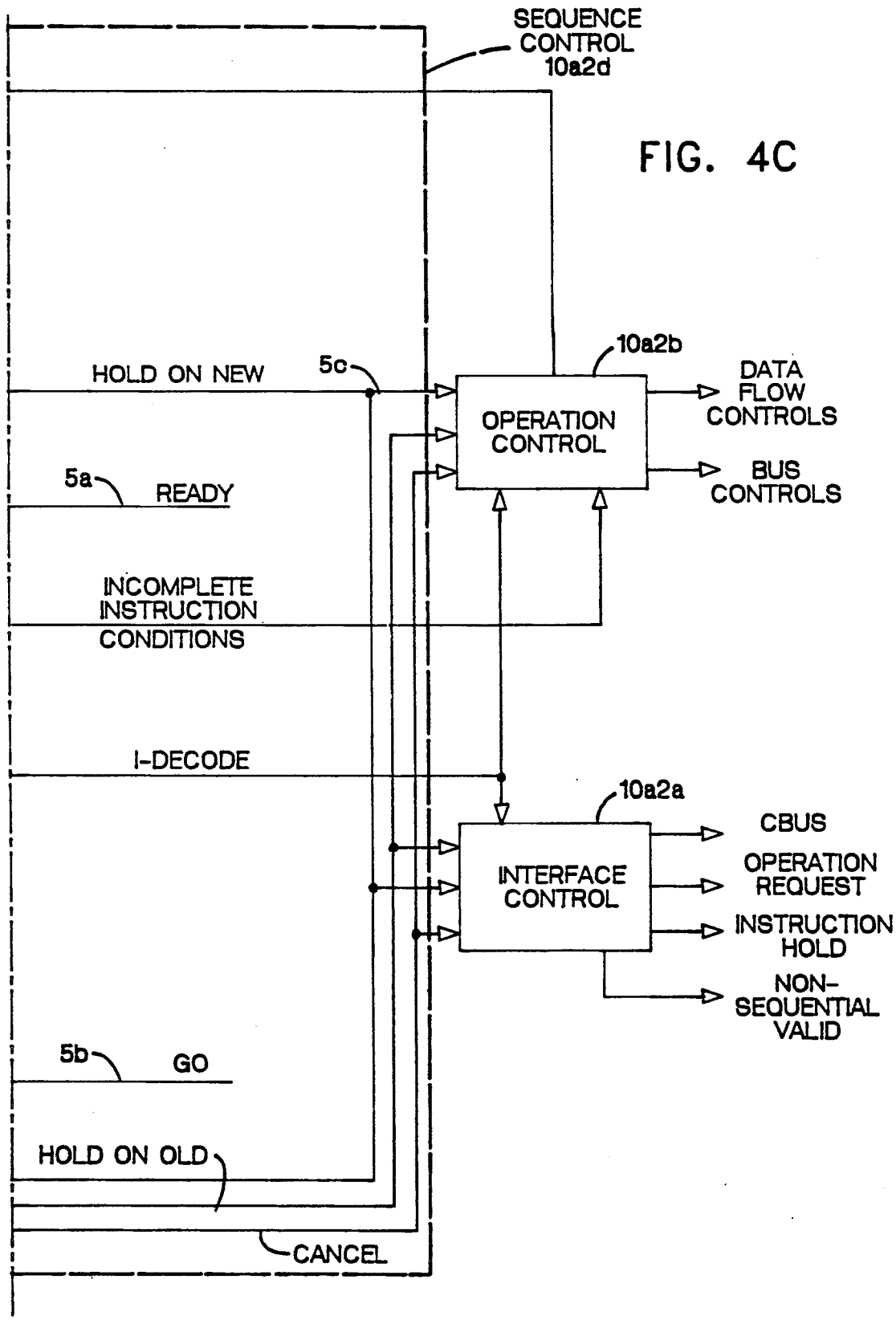
Figure 4D:
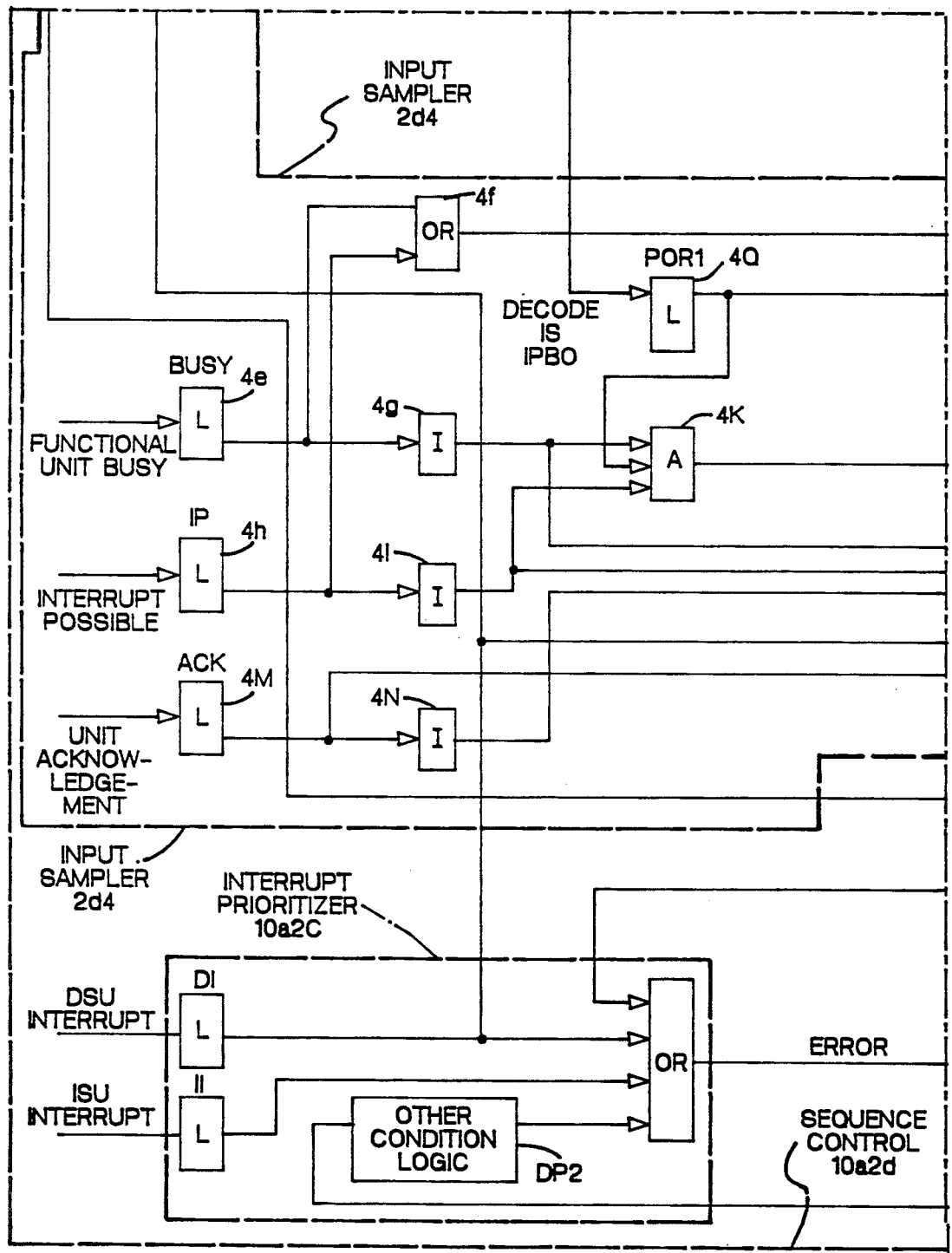
Figure 4E:
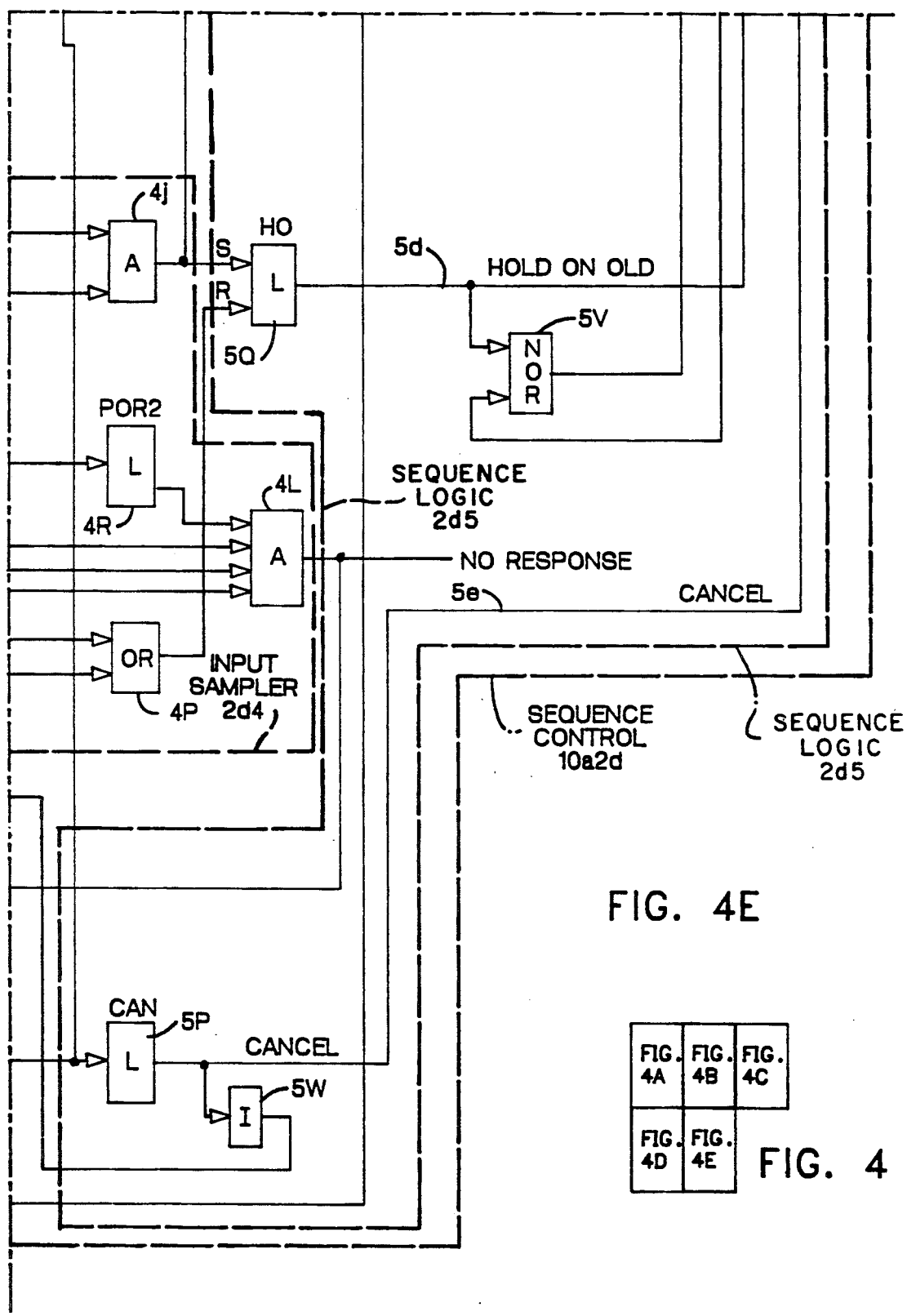

Referring to FIG. 3, a construction of the processor controller 10a2 of FIG. 2 is illustrated.

In FIG. 3, the processor controller 10a2 comprises an interface control 10a2a, an operation control 10a2b, an interrupt prioritizer 10a2c, and an IPU sequence control 10a2d. The sequence control 10a2d is connected to the operation control 10a2b and the interrupt prioritizer 10a2c via an I-decode line; is connected to the operation control 10a2b via a HOLD ON NEW line, a HOLD ON OLD line, and an INCOMPLETE INSTRUCTION CONDITIONS line; and is connected to the interface control 10a2a via the HOLD ON OLD line, the HOLD ON NEW line, and a CANCEL line. The operation control 10a2b generates the DATA FLOW CONTROLS signal and the BUS CONTROLS signal. The interface control 10a2a generates the OPERATION REQUEST signal and is connected to the Cbus. Furthermore, the sequence control 10a2d is connected to the interrupt prioritizer 10a2c via an ERROR signal, which is received from the prioritizer 10a2c, and is connected to the interrupt prioritizer 10a2c via a NO RESPONSE signal, which is transmitted to the prioritizer 10a2c. The interrupt prioritizer 10a2c receives the DSU INTERRUPT, and the ISU INTERRUPT signal and generates the ERROR signal in response thereto. The sequence control 10a2d receives the Ibus, the FUNCTIONAL UNIT BUSY, UNIT ACKNOWLEDGE, I-VALID, POSSIBLE ERROR, DBUS VALID, and EXECUTION RESULT signals. The EXECUTION RESULT signal, while energizing the sequence control 10a2d, also energizes the interface control 10a2a.

The interface control 10a2a communicates, via the Cbus, with other functional units in the system, receives information from the sequence control 10a2d, and drives the other functional unit operations. The interface control 10a2a also receives the IPU sequential state (i.e., the HOLD ON NEW, HOLD ON OLD, READY, GO, CANCEL) from the sequence control 10a2d and information relating to the current instruction. It then generates the required communication signals to the other functional units. It is assumed that the current instruction in the I-register 10a1 of FIG. 3 requires an operation in the DSU 10d and that the sequence control 10a2d is in the GO state. It is further assumed that the functional units are not busy, that is, the FUNCTIONAL UNIT BUSY signal is off. In this condition, the interface control 10a2a activates the OPERATION REQUEST signal. It also delivers an operation command and the associated command parameters onto the Cbus. The interface control 10a2a, as the name implies, interfaces with other functional units. The sequence control 10a2d (specifically, the I-decode of the sequence control) determines if the instruction (stored in its I-register) is an internal operation or a processor operation. The sequence control 10a2d makes this determination by decoding the opcode of the instruction. The output of the I-decode of the sequence control 10a2d is sent to the interface control 10a2a. The interface control 10a2a determines, with its inputs, which functional unit is needed, what unit operation is required, and what information must be passed to the functional units. These determinations may be made by decoding the instruction. The interface control 10a2a generates the OPERATION REQUEST signal by And'ing the processor operation with the GO state. Command information is transferred, from the interface control, via the Cbus. The Cbus is the common command bus that connects the IPU to all other functional units. The Cbus contains the functional unit address and the unit operation. By decoding the op code of the instruction, the required unit and the required unit operation is determined. Each functional unit has an identifier called the "unit address". When the IPU drives the Cbus, both the unit address and the unit operation are included. The communication between the IPU and the functional unit is determined by decoding the unit address field of the Cbus.

The operation control 10a2b receives information from the sequence control 10a2d, and governs the manner in which data flows in the IPU 10a and among the various functional units 10b, 10c, 10d, and 10e. The operation control 10a2b determines the source of the input operands, the required operation and the destination of the result. The operation control 10a2b also controls the internal busses that connect to the various functional units. For example, the Dbus is connected to the functional units. The operation control generates a signal which takes the IPU 10a off the Dbus and prepares another unit to drive the Dbus. The operation control 10a2b determines the source of a plurality of input operands required for the execution of an instruction, the required operation, and the destination of a result. For example, the instruction may specify an add operation wherein the contents of a general purpose register 2 (GPR 2) is added to the contents of a GPR 3. However, due to the pipelined nature of the execution, a GPR may not contain the correct data at the time of instruction execution. The correct data may, for example, be at the output of the RMU, or may be on a return path from a functional unit (ie, on the Dbus), or may be in the GPR, or may be at an output of the ALU. The operation control 10a2b signals the execution logic, the ALU, to select the input operand from either the RMU output, from the ALU output, from the GPR, or from the Dbus. In order to make this decision, the operation control 10a2b requires certain information, that is, the status of the incomplete instruction and the current instruction. The status of the incomplete instruction is supplied by sequence control 10a2d (specifically, the I-stack in the sequence control). The current instruction is supplied by the sequence control 10a2d (specifically, the I-decode of the sequence control). The combined conditions from the I-stack of the sequence control 10a2d and the I-decode of the sequence control 10a2d are used to determine the source of the input operands for the ALU execution logic. The required operation is determined from the I-decode of the sequence control 10a2d. The destination of the result is also determined from a decoding of the same instruction by the I-decode of the sequence control 10a2d. Since the destination of the result will not be used immediately, it is stored in the I-decode of the sequence control 10a2d and is used at the end of the instruction execution.

The interrupt prioritizer 10a2c monitors and collects all the interrupt signals. For each functional unit, an abnormal condition may be encountered wherein it is impossible to complete the requested operation. This abnormal condition is communicated to the IPU 10a via an interrupt signal. The interrupt prioritizer 10a2c monitors and collects these interrupt signals. For example, the interrupt prioritizer 10a2c receives the DSU INTERRUPT and the ISU INTERRUPT. The interrupts are checked against the system control information. If the interrupt is allowed, the interrupt information is passed to the sequence control 10a2d. If multiple interrupts occur at the same time, the interrupt prioritizer 10a2c prioritizes the interrupts according to the instruction sequence; that is, an interrupt caused by the earliest instruction in the pipeline has the highest priority. The prioritized interrupt is serviced via an interrupt routine. Further, with respect to the interrupt prioritizer 10a2c, by way of additional explanation of its function, when utilizing the parallel and pipelined approach to processing, there is more than one processing operation being performed simultaneously in a typical data processing system. Therefore, an abnormal condition, such as an interrupt, is likely to occur. Furthermore, multiple interrupts are also likely to occur within an instruction processing time unit. However, only one of these interrupt conditions are likely to be reported. The interrupt prioritizer 10a2c is a selector for selecting one of the multiple interrupts and for recording information associated with the selected interrupt in a group of special purpose registers. The information includes the type of interrupt, machine status at the time of interrupt, and the instruction address. Prioritization of the interrupts comprises two steps. Step 1 is based on the instruction sequence, and step 2 is based on the severity of the interrupts within a single instruction. In step 1, interrupts resulting from instruction 1 have a higher priority than interrupts resulting from instruction 2, where instruction 1 precedes instruction 2 in an instruction sequence. The interrupts selected from step 1 are fed to a second selector. In step 2, the interrupts are prioritized based on the events of that instruction execution. At times, three types of interrupts are detected at the same time. An execution interrupt belongs to the oldest instruction, which has the highest priority. An ISU interrupt belongs to the newest instruction, which has the least priority.

The sequence control 10a2d determines the sequential states of the IPU 10a, namely, GO, READY, HOLD ON OLD, HOLD ON NEW, CANCEL.

Referring to FIG. 4, a detailed construction of the sequence control 10a2d of FIG. 3 is illustrated.

In FIG. 4, the sequence control 10a2d of FIG. 3 is comprised of five (5) main parts: an I-register 2d1, an I-decoder 2d2, an instruction stack (I-stack) 2d3, an input sampler 2d4, and a sequence logic 2d5.

The I-register 2d1 receives information from the Ibus, the information being a new, next instruction to be executed. The I-register 2d1 drives the I-decoder 2d2 and the I-stack 2d3.

The I-decoder 2d2 determines the functions required to execute an instruction in the I-register 2d1 and determines the category of the instruction, such as internal operation or processor operation. It also determines which functions are required to execute the instruction. This information is transmitted to the sequence logic 2d5.

Figure 5:
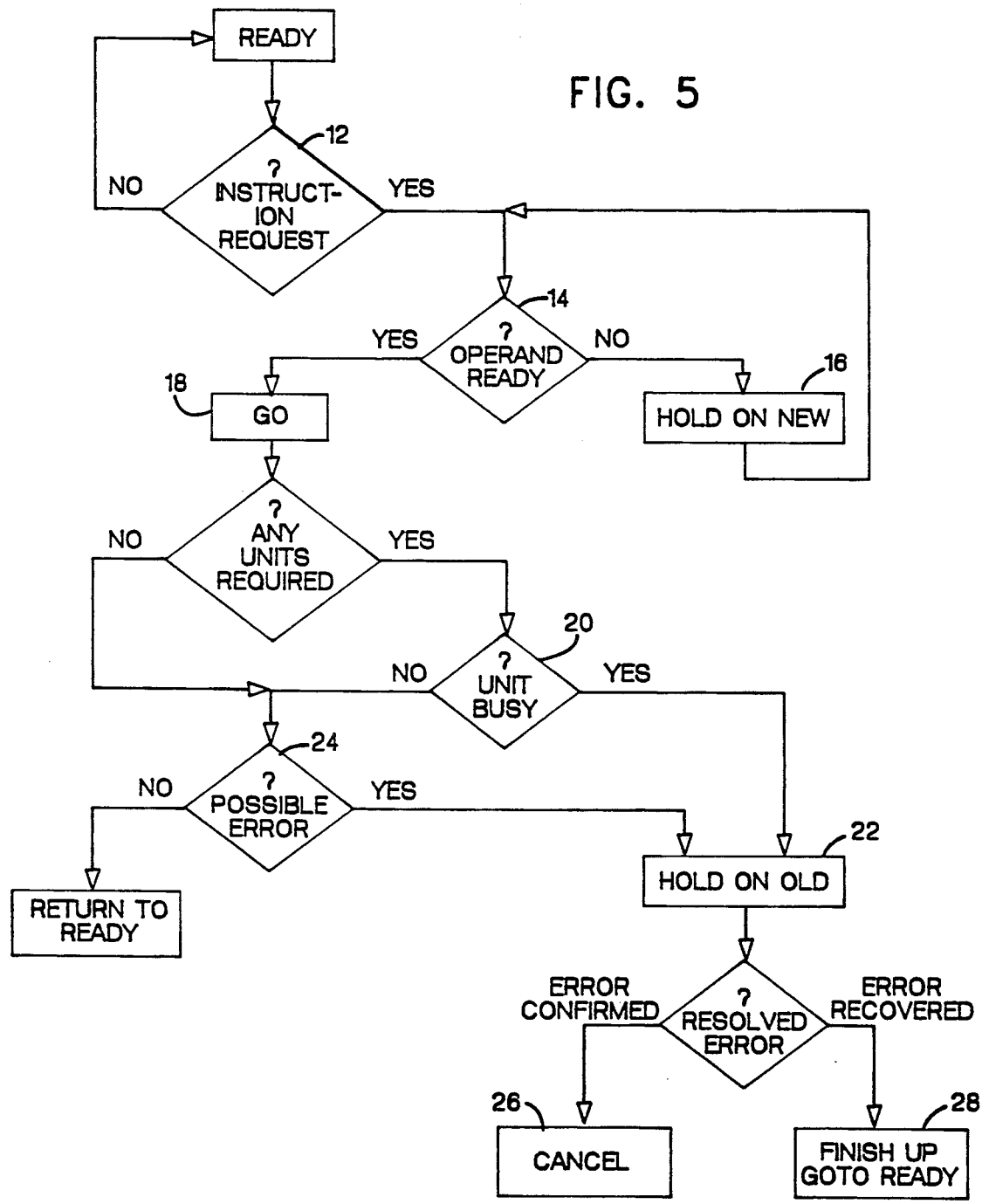
FIG. 5 illustrates a state diagram representing the function of the sequence logic of FIG. 4.

The I-stack 2d3 receives the output of the I-register 2d1, and stores information related to the last few instructions previously executed These last few instructions are still executing, each being disposed in various stages of the system pipeline. The information stored in I-stack 2d3 includes: (1) pending data from a functional unit and the destination of the data, (2) a successful branch was executed, (3) the data in a machine status register was modified by an executed instruction, (4) a non-sequential instruction was started, such as the supervisor call instruction, the return from interrupt instruction, and the trap instruction. The I-stack 2d3 is implemented with an algorithm termed the "first-in/first-out algorithm", which guarantees the instructions are executed in the correct order. The I-stack 2d3 drives the sequence logic 2d5. The I-stack 2d3 is a sequential logic. Each machine cycle, the I-stack 2d3 generates a state in response to an input from the I-register 2d1 and a "GO" state from the sequence logic 2d5. This state remains in the I-stack 2d3 until correct information is received from the input sampler 2d4 or the interrupt prioritizer 10a2c, at which time, the state is either modified or marked completed. The completed states will eventually be pushed out of the stack. An instruction is completed when all required execution is finished without an interrupt. A state in the I-stack 2d3 is also marked complete if the execution resulted in an interrupt. However, in this case, a new state or condition is generated in the interrupt prioritizer 10a2c. The remaining portion of this paragraph sets forth examples of states generated in the I-stack 2d3 (1) An input from the I-register 2d1 of FIG. 4 is decoded to determine if an instruction is requesting data from any of the functional units. If this condition is "true", and the sequence control of FIG. 4 is in the "GO" state, a "pending data" state is generated in the I-stack 2d3. This state indicates that the Dbus is in use. At a later time, when the functional unit is ready to send the requested data to the IPU 10a, the DBUS VALID signal is activated. This signal is monitored by the Input Sampler 2d4 and is returned to the I-stack 2d3 as "processor operation complete". The I-stack 2d3, with this response, marks the "pending data" state complete. This implies the Dbus is free for another unit operation. (2) An input from the I-register 2d1 is also decoded to determine if a branch instruction exists. If the decode indicates that a branch instruction exists, and the sequence control of FIG. 5 is in the "GO" state, a branch state is generated in the I-stack 2d3. At the end of the branch execution, a branch condition is determined by the ALU 10a3. If the execution resulted in a successful branch condition, the branch state in the I-stack 2d3 is modified to a successful branch state. This information is delivered to the sequence logic 2d5. This state indicates the prefetched instruction should not be executed. Thus, the sequence control of FIG. 4 enters the CANCEL state until the branch target instruction is available, at which time, the ISU 10b activates the I-VALID signal. The successful branch state is also delivered to the interface control 10a2a. The interface control 10a2a uses this state to request non-sequential instruction fetch from the ISU 10b. This request implies that the instruction address is on the Abus. (3) Again, by decoding the instruction in the I-register 2d1, a machine status modification condition is determined to exist. This condition also generates a state in the I-stack 2d3. Since the machine status has changed, the instructions prefetched by the ISU 10b are no longer valid. All prefetched instructions must be purged and the ISU 10b must refetch the instructions again using the new machine status information. The machine status modification state is marked complete when the refetched instruction is available. (4) The non-sequential instruction is another form of the branch instruction. The I-stack 2d3 generates a non-sequential state for this type of instruction. The non-sequential state is similar to a successful branch state.

The input sampler 2d4 monitors the interunit communication signals, which include the UNIT ACKNOWLEDGE, POSSIBLE ERROR, FUNCTIONAL UNIT BUSY, INSTRUCTION VALID, and interrupts which cause the ERROR. The input sampler 2d4 consolidates this information to determine the status of each operation and the conditions of the functional units 10b through 10e. The "status of each operation" and the "conditions of the functional units" include the following: (1) all functional units are not busy at the time of operation request, (2) a bus conflict condition has occurred, (3) the operation request was received and completed in one cycle, (4) the operation request was received but unable to complete the necessary initial checkings in one cycle, the initial checkings being required in order to guarantee that no interrupt can occur from the operation, (5) the operation request was not received because the unit is busy, (6) the operation request was not received because an abnormal condition has occurred, and (7) an external interrupt condition has occurred. The above information, itemized in points (1) through (7), drives the sequence logic. The input sampler 2d4 monitors the inter-functional unit communication. After an operation request is generated, the input sampler 2d4 monitors the communication signals among the functional units for a valid response every machine cycle. The input sampler 2d4 remembers (stores) the valid responses, consolidates the information, and transfers them to the I-stack 2d3 which can then update the status of the information stored therein. From the valid responses, the input sampler 2d4 determines the operation status and functional unit conditions. This information is used by the sequence logic 2d5. At the time the interface control 10a2a issues an operation request, the input sampler 2d4 sets one of its states depending on its inputs. If, at operation request time, the FUNCTIONAL UNIT BUSY signal is off, the input sampler 2d4 sets the "demand response" state This state means that the functional unit is free and able to process the request. The functional unit must respond by the end of the following machine cycle. The "demand response" state indicates to the sequence logic 2d5 that the requested functional unit is free and will process the operation. The sequence logic 2d5 may start the next instruction. In the next machine cycle, if there is no response, the input sampler 2d4 passes this information to the interrupt prioritizer 10a2c and an interrupt state is set therein. No response means that either the functional unit address or the functional unit operation is not recognized by any functional units in the system. The sequence logic 2d5 stops any further processing by setting the CANCEL state. The interrupt prioritizer 10a2c selects the highest priority interrupt and reports the condition of the selected interrupt. This condition is passed to the I-stack 2d3 as "processor operation complete". The main purpose is to release any interlock in the process so that the interrupt may be processed. The functional units may respond with either FUNCTIONAL UNIT BUSY, UNIT ACKNOWLEDGE, POSSIBLE ERROR, and interrupts.

Any of these responses will reset the "demand response" state of the input sampler. However, each response has different implications to the I-stack 2d3 and the sequence logic 2d5. If the functional unit responds with UNIT ACKNOWLEDGE, DBUS VALID, or interrupts, a "processor operation complete" signal is passed to the I-stack 2d3. If A POSSIBLE ERROR response is received from a functional unit, the operation request was received but the unit was unable to complete the necessary initial checking in one cycle. This condition drives the sequence logic 2d5 to the HOLD ON OLD state. This condition is indicated by the "processor operation received" and no "processor operation complete" and no "error" signals. If, at the time of operation request, the FUNCTIONAL UNIT BUSY signal is active, the input sampler 2d4 sets the "check acknowledge" state. The input sampler 2d4 monitors the response from a functional unit during the following cycle, a no response meaning the operation request was not received because the unit is busy. This condition also drives the sequence logic 2d5 to the HOLD ON OLD state. This condition is indicated by no "processor operation received" and no "error" signals. If the functional unit responds with UNIT ACKNOWLEDGE, this indicates that the operation request was received and completed in one cycle. This is indicated by the "processor operation complete" signal. This condition drives the sequence logic 2d5 to the GO state. Any interrupt response from a functional unit drives the sequence logic 2d5 to the CANCEL state. This is indicated by the "error" signal.

The sequence logic 2d5 obtains information from the I-stack 2d3, the I-decode 2d2, the input sampler 2d4, the interrupt prioritizer 10a2c, and the operation control 10a2b relating to the status and conditions of previously started instructions, new or future instructions, and the present status of the functional units ISU 10b, EAP 10c, DSU 10d, STC 10e, ESA 10i. The sequence logic 2d5 then decides which of the 5 states (READY, GO, HOLD ON OLD, HOLD ON NEW, and CANCEL) the IPU 10a should enter. The output of the sequence logic 2d5 is used to control the different portions of the IPU: ALU 10a3, RMU 10a4, GPR within the ALU 10a3, IAR 10a5, and SPR 10a5 updates, and is also used to control different functional units: EAP 10c and ISU 10b.

The following paragraph describes in detail the construction of the sequence control 10a2d of FIG. 4.

In FIG. 4, beginning with the sequence logic 2d5, lines 5a, 5b, 5c, 5d, and 5e identify the READY, GO, HOLD ON NEW, HOLD ON OLD, and CANCEL output signal lines in the sequence logic 2d5 of the sequence control 10a2d. The REALY output signal line 5a is connected to an output of latch 5f and to an input of OR gate 5g. The input of latch 5f is connected to the output of a NOR gate 5h. The first input of NOR gate 5h is connected to latch 4a of the input sampler 2d4, to a first input of AND gate 5i and to a first input of AND gate 5j. A second input of NOR gate 5h is connected to an output of OR gate 5k and to a first input of NOR gate 5N. A first input of OR gate 5k is connected to other condition logic 5L, a second input of OR gate 5k being connected to the output of AND gate 5i, a third input of OR gate 5k being connected to the output of AND gate 5M. A third input of NOR gate 5h is connected to a second input of NOR gate 5N, to an input of latch 5P, and to an output of the interrupt prioritizer 10a2c. A fourth input of NOR gate 5h is connected to a third input of NOR gate 5N, to a set input of latch 5Q. A second input of AND gate 5i is connected to an output of comparator 5R. A third input of AND gate 5i is connected to an output of the OPCOMP latch 3a, the output of the OPCOMP latch 3a being the INCOMPLETE INSTRUCTION CONDITIONS output signal which energizes the operation control 10a2b. The INCOMPLETE INSTRUCTION CONDITIONS signal, and therefore, the third input of AND gate 5i, is connected to a second input of AND gate 5M and to an output of the LP latch 3b of the I-stack 2d3. A first input of AND gate 5M is connected to an output of comparator 5S. The GO output line 5b is connected to the output of latch 5T, and to the first input of OR gate 5g. The output of OR gate 5g is connected to a clock generator which energizes a first input of IV latch 4a within the input sampler 2d4. The input of latch 5T is connected to the output of AND gate 5j. A first input of AND gate 5j is connected to the first input of NOR gate 5h, a second input of AND gate 5j being connected to the output of NOR gate 5N. The HOLD ON NEW line 5c is connected to an output of latch 5U, the input of latch 5U being connected to the output of OR gate 5k. The HOLD ON NEW line 5c is also connected to an input of the operation control 10a2b and to the interface control 10a2a. The HOLD ON OLD line 5d is connected to an output of latch 5Q, to the input of a NOR gate 5V, and to the input of the interface control 10a2a and the operation control 10a2b. The output of NOR gate 5V is connected to a clock circuit which energizes the input of an I-register 2d1. A second input of NOR gate 5V energizes the inputs of the interface control, the operation control 10a2b, and is connected to the HOLD ON NEW line. The CANCEL line 5e is connected to the input of the interface control 10a2a, the operation control 10a2b, to the output of latch 5P, and to the input of inverter 5W. The output of inverter 5W is connected to an input of AND gate 4b of the input sampler 2d4, the INSTRUCTION VALID signal energizing the other input of AND gate 4b. The output of AND gate 4b energizes the input of latch 4a, the output of latch 4a energizing one input of AND gate 5i and NOR gate 5h as previously mentioned Referring now to the input sampler 2d4, the DBUS VALID signal energizes the DV latch 4c, the output of the DV latch 4c energizing one input of OR gate 4d. The interrupt prioritizer 10a2c energizes the other input of OR gate 4d. The output of OR gate 4d energizes the reset input of LP latch 3b in the I-stack 2d3. The FUNCTIONAL UNIT BUSY signal energizes the busy latch 4e, the output of the busy latch 4e energizing one input of OR gate 4f and the input of an inverter 4g. The INTERRUPT POSSIBLE signal energizes the IP latch 4h, the output of the IP latch 4h energizing the other input of OR gate 4f and the input of inverter 4i. The output of OR gate 4f energizes one input of AND gate 4j. The output of inverter 4g energizes a first input of AND gate 4k and a second input of AND gate 4L. The output of inverter 4i energizes a third input of AND gate 4k, and a third input of AND gate 4L. The UNIT ACKNOWLEDGE signal energizes ack latch 4M, the output of latch 4M energizing an inverter 4N and a second input of OR gate 4P. The output of inverter 4N energizes the fourth input of AND gate 4L. In the meantime, the interrupt prioritizer 10a2c energizes the first input of OR gate 4P, along with the second input of OR gate 4d1, as previously mentioned. The OR gate 4P output energizes the reset input of latch 5Q within the sequence logic 2d5, the latch 5Q energizing a first input of NOR gate 5V and generating the HOLD ON OLD signal, as previously mentioned. Referring now to the I-register 2d1, the I-register 2d1 receives an instruction via the Ibus and a clock pulse from a clock generator, which is connected to NOR gate 5N. The I-register 2d1 energizes DD latch 3c of the I-stack 2d3, while the output of the clock generator energizes the other terminal of the DD latch 3c as well as a second input of the DA latch 3d of the I-stack 2d3 and a further input of the LP latch 3b of the I-stack 2d3 In addition to energizing DD latch 3c, I-register 2d1 also energizes one input of comparator 5R, while the output of DD latch 3c energizes the other input of comparator 5R. The output of comparator 5R energizes the second input of AND gate 5i. Furthermore, I-register 2d1 energizes the input to I-decode 2d2, one input to comparator 5S, and a first input to DA latch 3d of the I-stack 2d3 The output of the DA latch 3d energizes the second input of comparator 5S. The output of comparator 5S energizes the one input to AND gate 5M, as previously mentioned. In response to energization of the I-decode 2d2 by the I-register 2d1, the I-decode 2d2 decodes the instruction in the I-register and then energizes the set input of the OPCOMP latch 3a. The reset input of the OPCOMP latch 3a is energized by the EXECUTION RESULT signal. The output of OPCOMP latch 3a is connected to the third input of AND gate 5i and is the INCOMPLETE INSTRUCTION CONDITIONS signal, which energizes the operation control 10a2b, as previously mentioned. The I-decode 2d2 output, in addition to energizing the set input of the OPCOMP latch, also represents the I-DECODE signal which energizes the operation control 10a2b, the interface control 10a2a and the interrupt prioritizer 10a2c. The I-decode 2d2 output energizes the set input of the LP latch 3b within the I-stack 2d3 and energizes a POR1 latch 4Q. As mentioned previously, LP latch 3b energizes the second input of AND gate 5M. POR1 latch 4Q energizes the second input of AND gate 4j as well as the second input of AND gate 4k. As previously mentioned, AND gate 4j output is connected to the set terminal of latch 5Q within the sequence logic 2d5. The AND gate 4k output is connected to the input of a PORZ latch 4R. The PORZ latch 4R output is connected to the first input of AND gate 4L. The AND gate 4L generates the NO RESPONSE signal and energizes the interrupt prioritizer 10a2c.

Referring to FIG. 5, a state diagram is illustrated which describes the functional operation of the sequence logic 2d5 of FIG. 4.

In FIG. 5, the IPU 10a is in an idle mode and the INSTRUCTION VALID signal is active. Therefore, IPU 10a is in the READY state. The IPU is prepared to enter the GO state. The IPU executes an instruction while in the GO state. At the end of the GO state, the IPU normally re-enters the READY state. If execution of an instruction has been requested, block 12, and the instruction uses operand data which is not ready, block 14, the IPU cannot execute the instruction. Therefore, it enters the HOLD ON NEW state, block 16, and remains in this state until the operand data is ready. If the operand data is ready, the IPU enters the GO state, block 18, and executes the instruction. If the instruction comprises two steps, step A and step B, the IPU executes step A while in the GO state However, if the IPU attempts to execute step B, which requires the use of another functional unit (e.g., the ISU, the DSU, etc), and the other functional unit signals the IPU that it is performing another execution and is therefore busy, block 20, the IPU enters the HOLD ON OLD state, block 22. In this state, the IPU 10a freezes all logic, holding the results of the previous execution of step A and waits until the other functional unit is no longer busy. When the other functional unit is no longer busy, the IPU releases all logic and completes the execution of the instruction. The IPU then re-enters the READY state when the other functional unit acknowledges that it has received the information required to perform step B. Another situation which would cause the IPU to enter the HOLD ON OLD state is as follows: the other functional unit is executing step B, and the IPU re-enters the READY state, and then the GO state for the purpose of executing another new instruction; the other functional unit is experiencing a problem and signals the IPU of a possible error condition (the POSSIBLE ERROR signal becomes active), block 24; normally, a prior art processor would wait for the possible error condition to disappear before beginning execution of the new instruction, however, the IPU 10a, of the subject invention, executes the new instruction regardless of the possible error condition; when execution of the instruction is complete, but prior to any destination updates, the IPU 10a enters the HOLD ON OLD state, block 22; it remains in this state until the possible error condition is either resolved or confirmed; if the error is confirmed, the IPU enters the CANCEL state, block 26, and the results of the execution of the instruction are discarded; if the error is resolved, the IPU finishes the operation and returns to the READY state, block 28, in preparation for execution of the next instruction.

The functional operation of the sequence control 10a2d of FIG. 3, according to the present invention, will be described in the following paragraphs with reference to FIGS. 1, 2, 3 and 4 of the drawings.

In order to illustrate the function of the sequence control of FIG. 3, with the aid of FIGS. 1-2 and 4, the following instruction stream is utilized as an example:

1. LOAD into register 3;
2. LOAD into register 2;
3. ADD content of register 2 to register 3, and place the result into register 1;
4. unconditional branch Refer to the following conservation chart for the execution of these instructions. In the conservation chart, the following legend is utilized:

R = Ready
G = GO
HO = Hold on Old
HN = Hold on New
C = Cancel

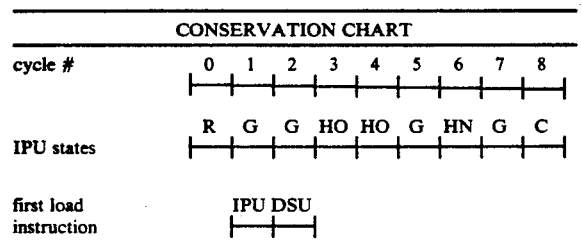

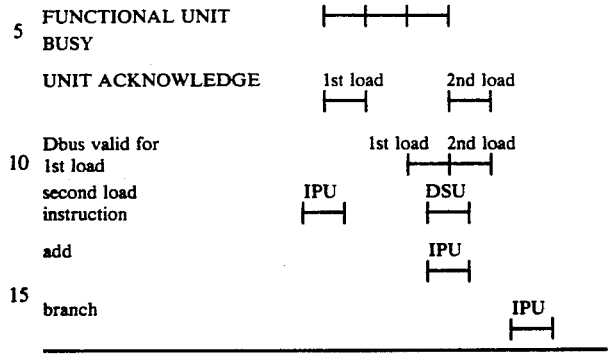

In FIG. 3, with further reference to FIGS. 1-2, during cycle 0, it is assumed that all functional units 10a through 10e are idle and not busy. Therefore, the IPU is not processing an instruction. The sequence control 10a2d places the IPU 10a in the READY state. A first load instruction is fetched from the ISU 10b. The ISU 10b must transfer the status of the load instruction to the IPU 10a, via its communication link, which communication link includes: the Ibus, INSTRUCTION VALID, ISU INTERRUPT, and FUNCTIONAL UNIT BUSY. The ISU 10b delivers the first load instruction to the IPU 10a via the Ibus. At the same time, the ISU 10b activates the INSTRUCTION VALID signal to indicate a valid condition on the Ibus. It is assumed, that no abnormal condition occurs during the fetch of the load instruction; therefore, the ISU INTERRUPT signal is not active. Since the fetched instruction is in the ISU cache, the FUNCTIONAL UNIT BUSY signal from the ISU 10b is not active.

The sequence control 10a2d monitors all inter-functional unit communications, including the FUNCTIONAL UNIT BUSY, INSTRUCTION VALID, and ERROR signals. It receives the following information: an instruction is on the Ibus, this instruction is valid, and no interrupt is encountered outside the IPU 10a.

The ISU INTERRUPT signal is also monitored by the interrupt prioritizer 10a2c. However, it is assumed that no active interrupt occurred during the load instruction fetch. For this reason, no significant information is passed from the interrupt prioritizer 10a2c to the sequence control 10a2d.

In FIG. 4, the content of the Ibus is received and stored in the I-register 2d1. The output of the I-register 2d1 drives the DD latch 3c and DA latch 3d of the I-stack 2d3 and the I-decoder 2d2 The DA latch 3d of the I-stack 2d3 stores information associated with the first load instruction, such information being pushed out of the latches of. the I-stack 2d3 when the instruction execution is complete. The information stored in the latches of the I-stack include:

1. load data is pending (LP latch 3b of I-stack 2d3);
2. the destination of the data (DA latch 3d of I-stack 2d3);
3. the source of the data is the DSU (LP latch 3b); and
4. the instruction was a load instruction (LP latch 3b).

This information, stored in the latches of the I-stack 2d3, is used in the following cycle and is needed for the state control decisions for the next instruction. Prior to the execution of this load instruction, the DD latch 3c, DA latch 3d, OPCOMP latch 3a, and the LP latch 3b of I-stack 2d3 contained no valid information. Consequently, no useful information was passed from these latches.

The I-decoder 2d2 decodes the instruction and determines the following:
1. which input operands are required;
2. what operation is required;
3. which functional units are required; and
4. what functional unit operations are required The I-decoder 2d2 passes this information to the operation control 10a2b, the OPCOMP latch. 3a, the LP latch 3b, the POR1 latch 4Q, and the interface control 10a2a of FIG. 4.

The operation control 10a2b receives the I-decoder 2d2 output, determines if the input operands and the interunit busses are ready, and delivers this information to the sequence control 10a2d.

In cycle 1, the sequence control 10a2d receives the following information from the ISU 10b, the I-decoder 2d2, and the operation control 10a2b:
1. an instruction is on the Ibus;
2. the instruction is valid;
3. no abnormal conditions encountered anywhere in the functional units 10b-10e; and
4. input operands are ready.

With the above conditions, the sequence control 10a2d places the IPU 10a in the GO state, and the IPU 10a begins to process the load instruction. The GO state is communicated to all parts of the IPU 10a.

The interface control 10a2a receives the outputs from the I-decoder 2d2. The interface control drives the operations of the various functional units 10b-10e required for the execution of the instruction. Since the I-decoder 2d2 is decoding the first load instruction, the interface control 10a2a generates an OPERATION REQUEST, a command, and associated command parameters, and delivers the command and command parameters to the Cbus.

Recall that the load instruction is used to fetch a piece of stored data, the location of the stored data being defined by a storage address. The storage address is formed by the addition of two operands, the addition operation being performed in the ALU 10a3. When the stored data is retrieved, it is stored in a register of the IPU 10a.

Keeping this in mind, the operation control 10a2b governs how data flows, that is, in this example, it determines the sources of the input operands. It determines an addition operation is required to calculate a storage address of the first load instruction. The operation control 10a2b signals the ALU 10a3 to deliver the storage address, the result of the addition operation, onto the Abus.

The two operands, required to calculate the storage address, are transmitted to the ALU 10a3 via the Dbus and the RMU.

The ALU 10a3 receives the output of the sequence control 10a2d and the output of the operation control 10a2b. A GO state from the sequence control 10a2d means "proceed as directed from the operation control 10a2b." The ALU 10a3 gates the two operands from the Dbus into its arithmetic logic. An addition operation is performed, thereby forming the storage address. The storage address is transmitted from the ALU 10a3 onto the Abus as directed by the operation control 10a2b. The storage address, on the Abus, interrogates the DSU 10d at an address location defined by the storage address. In response, the stored data is read from the DSU 10d and placed on the Dbus.

The RMU 10a4 receives the output of the sequence control 10a2d and the output from the operation control 10a2b. The RMU 10a4 puts the Dbus on receiving mode and waits for receipt of the stored data. When the data arrives, the RMU 10a4 expects the operation control 10a2b to determine what to do with the received, stored data.

In cycle 2, the DSU 10d receives the OPERATION REQUEST signal, the request parameters transmitted via the Cbus, and the storage address transmitted via the Abus. The DSU 10d has all the necessary information to process the load operation request.

It is assumed that the requested stored data, as indicated by the storage address, is not in the DSU 10d, but rather is in the main store (MS) 10f. It takes the DSU 10d multiple machine cycles to retrieve the data from the MS 10f. The DSU 10d must communicate this operation status back to the IPU 10a The DSU 10d interface includes UNIT ACKNOWLEDGE, FUNCTIONAL UNIT BUSY, POSSIBLE ERROR, and DSU INTERRUPT. The DSU 10d responds with UNIT ACKNOWLEDGE, and FUNCTIONAL UNIT BUSY at the end of cycle 2. It is further assumed that no abnormal condition occurred in processing this operation and that the POSSIBLE ERROR and DSU INTERRUPT signals are not active. UNIT ACKNOWLEDGE is active for only one cycle. FUNCTIONAL UNIT BUSY is active for the entire duration when the DSU 10d retrieves data from the MS 10f.

The sequence control 10a2d monitors the operation status and functional unit conditions. It receives the DSU 10d interface: UNIT ACKNOWLEDGE, FUNCTIONAL UNIT BUSY, POSSIBLE ERROR, DSU INTERRUPT The DSU 10d responds with UNIT ACKNOWLEDGE, in response to the previous operation request, indicating that the OPERATION REQUEST, the Cbus information, and the Abus information are received by the DSU 10d. The FUNCTIONAL UNIT BUSY response, in the absence of POSSIBLE ERROR and DSU INTERRUPT, indicates that the DSU guarantees no interrupt can result from this operation and, at the same time, the requested data will not be delivered immediately, rather, it will take several cycles before the data is sent. The data will be accompanied by the DBUS VALID signal The sequence control 10a2d receives the DBUS VALID signal at the beginning of cycle 3.

In the meantime, the IPU 10a proceeds to the next instruction, the second load instruction. Since the second load instruction is also a load, this second instruction is again fetched from the ISU 10b and is delivered to the IPU via the Ibus. The delivery of this instruction is accompanied by the INSTRUCTION VALID signal. It is also assumed that no abnormal condition occurred during the fetch of this instruction. Sequential instruction fetch is accomplished automatically by the ISU 10b, unless interrupted by the IPU 10a. A new instruction is sent on the Ibus every machine cycle.

As with the first instruction, the second load instruction is stored in the I-register 10a1 of the IPU 10a, and, subsequently, in the I-register 2d1 of the sequence control 10a2d In FIG. 4, the I-decoder 2d2; the DD latch 3c, the DA latch 3d, the OPCOMP latch 3a and the LP latch 3b of the I-stack 2d3; and the operation control 10a2b function in a similar fashion as in the case of the first load instruction.

In FIG. 3, the sequence control 10a2d receives the inputs from the I-register 10a1, interrupt prioritizer 10a2c, inter-unit communication signals, and the operation control 10a2b. The sequence control 10a2d examines all the inputs and observes the following:

1. the previous instruction was a load instruction;
2. the incomplete portion of the first load is the return of the stored data;
3. the stored data of the first load is not needed in the current instruction;
4. the first load instruction causes no interrupt;
5. the current instruction is also a load; and
6. input operands of the second load are ready.

The sequence control 10a2d directs the IPU 10a to remain in the GO state and execute the second load instruction in cycle 2.

The interface control 10a2a generates the OPERATION REQUEST signal, as before, and transmits this signal on the Cbus, in the same manner as described with reference to the first load instruction.

The operation control 10a2b generates the operation signals, as before, and transmits these signals to the ALU and the RMU in the same manner as described with reference to the first load instruction. The ALU and the RMU operate in the same way as in the previous load instruction. The system of FIG. 1 advances to cycle 3.

Still referring to FIG. 3, in cycle 3, the sequence control 10a2d receives significant information from the DSU 10d, this information being: "the DSU 10d is busy processing the first load operation and is unable to start the second operation". The sequence control 10a2d then directs the IPU 10a to enter the HOLD ON OLD state. The HOLD ON OLD information is transferred to different parts of the IPU 10a, namely, to the I register 2d1, the DD and DA latches 3c and 3d of the I-stack 2d3, the ALU 10a3, the RMU 10a4, the interface control 10a2a, and the operation control 10a2b. The use of the HOLD ON OLD state information varies in different parts of the IPU 10a.

By this time, during cycle 3, the third instruction is stored in the I-register 10a1 (FIG. 2) of the IPU, and subsequently, in the I-register 2d1 (FIG. 4) of the sequence control 10a2d. The I-register 2d1 receives the state information from the sequence logic 2d5. As far as the I-register 2d1 is concerned, the HOLD ON OLD state means "hold the current content of the I-register", that is, this instruction will be processed at a later time. The I-register 2d1 stops gating in new instructions from the Ibus unless otherwise directed by the sequence logic 2d5.

The DD and DA latches 3c and 3d of the I-stack 2d3 also receive state information. As far as the DD and DA latches 3c and 3d of the I-stack 2d3 are concerned, the HOLD ON OLD state means "stop putting instruction information into the stack".

The ALU 10a3 uses the HOLD ON OLD state to override the operation control 10a2b. It holds the calculated storage address of the second load on the Abus.

The RMU 10a4 also uses the HOLD ON OLD state to override any operation control pertaining to the rotate and merge function. In this case, the RMU 10a4 continues to put the Dbus in receiving mode and waits for the data return from the first load instruction.

The interface control 10a2a uses the HOLD ON OLD state to hold the OPERATION REQUEST signal and the Cbus of the second load instruction. The IPU 10a must retain all information relating to the second load instruction because the DSU 10d is busy with the first load operation and information pertaining to the second load has not yet been received by the DSU 10d.

The ISU 10b delivers microinstructions to the IPU 10a. When the IPU 10a enters the HOLD state, both the ISU 10b and the EAP 10c must be stopped Since the I-register 2d1 is not receiving any more instructions from the Ibus, the ISU 10b must stop placing new instructions onto the Ibus. The interface control 10a2a activates the INSTRUCTION HOLD signal to stop the ISU 10b from placing any new instructions onto the Ibus.

The ISU 10b receives from the EAP 10c the beginning the each microroutine associated with the instructions being executed Since the ISU 10b is stopped, it is not receiving any more information from the EAP 10c. Therefore, the EAP 10c must also be stopped. The interface control 10a2a stops the EAP 10c via the INSTRUCTION HOLD signal.

The operation control 10a2b uses the HOLD ON OLD state to block the transmission of information relating to the new instruction, the ADD instruction, to the sequence control 10a2d.

While most of the IPU is dorment as a result of the HOLD ON OLD state, the sequence control 10a2d is very active It monitors any changes to the inter-functional unit communication, complies with any status changes and transfers the updated status to generate new states.

At this point, it is assumed that the first load operation is resolved at the end of cycle 4. This means that, at the end of cycle 4, the load data is sent to the IPU 10a via the Dbus. This data transfer is accompanied by the DBUS VALID signal It is further assumed that the FUNCTIONAL UNIT BUSY signal is also deactivated in cycle 4.

As soon as the DBUS VALID signal is active, the sequence control 10a2d passes the completion of the first load information to the operation control 10a2b during cycle 5.

In cycle 5, the operation control 10a2b then generates control signals to store the stored data. The sequence control 10a2d then examines all its inputs. It concludes the following:

1. a second load operation is not yet completed;
2. information relating to the second load is received by the DSU 10d;
3. the current instruction (the ADD instruction) is an internal operation;
4. the input operands of the current instruction do not depend on the stored data of the second load instruction; and
5. input operands for the add instruction are ready.

With the above condition, the sequence control 10a2d leaves the HOLD ON OLD state and enters the GO state. The IPU 10a proceeds to execute the next instruction, the ADD instruction.

It is assumed that the stored data of the second load instruction returns to the IPU 10a at the end of cycle 6. The ADD instruction is an IPU internal operation. It is used to add two input operands. The addition result is stored into a register.

The operation control 10a2b generates the execution signals to the ALU 10a3. The execution signals include the sources of the input operands, the operation is an addition operation, and the destination of the addition results.

Since information relating to the second load instruction are received by the DSU 10d, the interface control 10a2a deactivates the OPERATION REQUEST and the Cbus. Since the IPU 10a enters the GO state, the interface control 10a2a also deactivates the INSTRUCTION HOLD signal.

The sequence control 10a2d continues to monitor the functional unit status. It is our assumption that, in this cycle, there are no changes in the inter-functional unit communication. Therefore, the machine advances to cycle 6.

In cycle 6, the I-register 2d1 stores a new instruction from the Ibus The I-decoder 2d2, in turn, receives the new instruction (the branch instruction), determines the instruction category and determines the execution functions. The operation control 10a2b determines that one of the input operands of the branch instruction is not yet disposed within the IPU 10a. In this cycle, the inputs to the sequence control 10a2d illustrate the following:

1. the second load is pending;
2. the IPU 10a is waiting for the return, from the DSU or from the main store, of the stored data;
3. the current instruction is a branch instruction;
4. one of the input operands of the branch instruction target address is the stored data of the second load instruction.

Since the IPU 10a does not have the input operands to execute the instruction, the sequence control 10a2d leaves the GO state and enters the HOLD ON NEW state. This sequence is sent to different parts of the IPU 10a, namely, to the interface control 10a2a, the operation control 10a2b, the ALU 10a3, the I-register 2d1, and the DD and DA latches 3c and 3d of the I-stack 2d3. The interface control 10a2a uses the HOLD ON NEW state to stop processing the new instruction, the branch instruction. This instruction will be processed at a later time. The interface control 10a2a has the responsibility to stop the ISU 10b and the EAP 10c via the INSTRUCTION HOLD signal, that is, if the current instruction is a processor operation, the interface control 10a2a generates the INSTRUCTION HOLD signal and blocks (inhibits) the transmission of the OPERATION REQUEST signal and inhibits the activation of the Cbus to the functional units.

The operation control 10a2b uses the HOLD ON NEW state to continue all previously started operations but stops execution of the current instruction, the branch instruction. In this example, the operation performed in the last cycle was the execution of the ADD instruction. The destination of the addition result is determined in the current cycle. In spite of the HOLD ON NEW state, the addition result is allowed to return to its destination. Furthermore, in response to the HOLD ON NEW state, the functioning of the ALU 10a3, the I-register 2d1, and the DD and DA latches 3c and 3d of the I-stack 2d3 terminates.

As assumed earlier, the second load operation is resolved at the end of the current cycle, cycle 6. The sequence control 10a2d samples the DBUS VALID signal and determines the operation status update of the second load operation. In cycle 7, the sequence control 10a2d receives the operation status update from the DSU 10d. Execution of the branch instruction depended upon completion of the second load operation. Therefore, the completion of the second load operation allows the execution of the branch instruction to commence. The sequence controller 10a2d leaves the HOLD ON NEW state and enters the GO state. The IPU 10a proceeds to execute the next instruction, the branch instruction.

A branch instruction is used to change the sequential instruction stream. An unconditional branch forces the machine to execute a successful branch operation. The next, valid instruction after a successful branch is a target instruction. The target instruction is fetched from a storage address formed by adding two input operands.

The GO state signals the interface control 10a2a to execute the branch instruction. The interface control 10a2a activates the NON-SEQUENTIAL VALID signal. This signal informs the ISU 10b that the IPU 10a encounters a branch instruction and the new instruction fetch should start at the new branch target address on the Abus. The ISU 10b stops any further instruction fetches from the current sequential instruction address, deactivates the INSTRUCTION VALID signal, and starts instruction fetch at the address on the Abus.

The operation control 10a2b determines that the operation is an addition operation, and that the addition result is to be transmitted to the ALU 10a3 via the Abus. The ALU 10a3, I-register 2d1, I-decoder 2d2, and the DD and DA latches 3c and 3d of the I-stack 2d3 perform their normal function.

In cycle 8, the sequence control 10a2d receives new inputs and again examines the IPU 10a conditions as follows:

1. the last instruction was a branch instruction;
2. the branch was successful;
3. the branch information was delivered to the ISU 10b;
4. the information was received by the ISU 10b.

At this point, the IPU 10a is waiting for the branch target instruction from the ISU 10b (not a branch plus one instruction, rather, a non-sequential instruction not in the normal instruction sequence). The current instruction in the I-register 2d1 reflects the branch plus one instruction. This instruction was fetched from the ISU 10b prior to any knowledge by the ISU 10b of the NON-SEQUENTIAL VALID signal This branch plus one instruction should be ignored. In this situation, the sequence control 10a2d leaves the GO state and enters the CANCEL state. This sequence is sent to different parts of the IPU 10a.

All functions in the IPU 10a cancel or ignore the current instruction.

One cycle later, the IPU 10a prepares to receive the branch target instruction. The sequence control 10a2d leaves the CANCEL state and enters the READY state. Therefore, the sequence control 10a2d sequences the IPU 10a through different states to execute the instruction routine.

The functional operation of the sequence control 10a2d of FIG. 4 will be described in the following paragraph with reference to FIG. 4 of the drawings.

In FIG. 4, an instruction is presented to the IPU 10a, accompanied by the INSTRUCTION VALID (I-VALID) signal, every machine cycle. This instruction is stored in the I-register 2d1. Since the output of the I-register 2d1 is connected to the I-decode 2d2, the I-decode 2d2 decodes the instruction stored in the I-register 2d1. If the I-decode 2d2 decodes an instruction (IW), which requires that an internal operation result should be stored away, the address of the result is saved in the DD latch 3c of the I-stack 2d3. At the same time, the OPCOMP latch 3a is set. The OPCOMP latch 3a indicates that the address, contained in the DD latch 3c, has been modified by some previous instruction, but the new data, associated with the modified address, has not yet been retrieved. The OPCOMP latch 3a is reset when a register, whose address is contained in the DD latch 3c, is updated If the I-decode 2d2 decodes an instruction that requires certain input operands to execute the operation, the address of an input operand is compared with the content of the DD latch, via comparator 5R in the sequence logic 2d5. If the compare is positive, and the OPCOMP latch 3a 1 is set on, the HN latch 5U is also set. This condition indicates that the required input operand is not available and that instruction execution must be delayed until the input operand is available. When the HN latch 5U is set, the HOLD ON NEW state is initiated. In the HOLD ON NEW state, the IPU 10a holds the instruction in the I-register 2d1 until the HN latch 5U is reset. However, operations associated with the previously started instruction are allowed to complete, that is, execution and update of the instructions associated with the address pointed to by the DD latch 3c, in the I-stack 2d3, is allowed to proceed. When the update occurs, the OPCOMP latch 3a, in the I-stack 2d3, is reset. The input to the HN latch 5U goes inactive, and the HN latch 5U is reset. The IPU 10a can now start to execute the instruction stored in the I-register 2d1. If the I-decode 2d2 decodes a processor operation (IPBO), the conditions of the other functional units are monitored, the interunit communication signals being FUNCTIONAL UNIT BUSY, UNIT ACKNOWLEDGE, INTERRUPT POSSIBLE (Possible Error). The FUNCTIONAL UNIT BUSY signal is sampled every machine cycle, and is stored in the busy latch 4e within the input sampler 2d4. When this latch is set, it indicates the functional unit is busy with some previously started operation. When the I-decode 2d2 decodes a processor operation, and the busy latch 4e is set on, the HO latch 5Q is set. The HO latch 5Q, when set, initiates the HOLD ON OLD state. In this condition, the IPU 10a starts the execution of the instruction, but it then holds the execution result without any status update. A new instruction is saved in the I-register 2d1. The FUNCTIONAL UNIT BUSY status will disappear as soon as the required functional unit is free. When this occurs, the busy latch 4e is reset, which, in turn, will reset the HO latch 5Q. At this time, the required functional unit starts the unit operation and completes the execution of the instruction. The IPU begins execution of the new instruction stored in the I-register 2d1. When the I-decode 2d2 decodes a processor operation, the POR1 latch 4Q is set. The POR1 latch 4Q, when set, indicates a processor operation request. If the functional unit is not busy at the time of the operation request, then the POR2 latch 4R is set. The POR2 latch 4R, when set, indicates the functional units are not busy at the time of operation request and the IPU expects the functional unit to execute the operation and to change it s status. However, if there is no response from the functional units, then the CAN latch 5P is set. The CAN latch 5P, when set, indicates an error occurred and the requested operation is not recognized by any functional units in the system. In this condition, all subsequent instructions in the current instruction stream must be cancelled. The setting of the CAN latch 5P generates the CANCEL state. Other conditions, that can set the CAN latch 5P, include functional unit interrupt signals resulting from unit operations, such as DSU INTERRUPT or ISU INTERRUPT.

Further, every instruction sent to the IPU 10a is accompanied by the INSTRUCTION VALID (I-VALID) signal. This signal is set in the IV latch 4a. The IV latch 4a is pulsed every machine cycle. When the IV latch 4a is set, it indicates an instruction is available to the IPU. If the HN latch 5U, the HO latch 5Q, the CAN latch 5P, and the IV latch 4a are all reset (off), then the R latch 5f is set. The R latch 5f, when set, generates the READY state. The R latch 5f is pulsed every machine cycle. If the input condition changes, the status of the R latch 5f will change. The READY state indicates the IPU is idling and, as soon as an instruction is available, it will change to the GO state. Whenever the IV latch 4a is set, the R latch 5f is reset and, at the same time, the G latch 5T is set. The G latch 5T, when set, generates the GO state. This is the busy state for the IPU 10a. From this point on, whenever any unexpected condition occurs, the G latch 5T will be reset and one of the other states will be set. In summary, the READY, GO, HOLD ON NEW, HOLD ON OLD, and CANCEL states control the instruction execution of the IPU 10a of FIG. 1.

The invention being thus described, it will be obvious that the same may be varied in many ways. Such variations are not to be regarded as a departure from the spirit and scope of the 26 invention, and all such modifications as would be obvious to one skilled in the art are intended to be included within the scope of the following claims.

I claim:

1. In a computer system including an instruction processing unit for attempting an execution of a first instruction among a plurality of instructions, and a plurality of functional units connected to the instruction processing unit for assisting said instruction processing unit in the execution of said first instruction, said instruction processing unit comprising:

condition means connected to said functional units for detecting a condition occurring either prior to or during the attempted execution of said first instruction, said condition preventing the execution of said first instruction;

state generating means connected to said condition means;

for temporarily placing said instruction processing unit in a HOLD ON NEW state preventing said instruction unit from beginning execution of a new unexecuted instruction when said condition occurs prior to presentation of said first instruction to said instruction processing unit, for temporarily placing said instruction processing unit in a HOLD ON OLD state preventing said instruction processing unit from completing execution of a partially executed current instruction when said condition occurs during the execution of said first instruction, for placing said instruction processing unit in a GO state permitting the completion of execution of a partially executed current instruction and the starting of execution of a new, unexecuted instruction when said condition is removed and a new instruction awaits execution, for placing said instruction processing unit in a CANCEL state cancelling execution of said first instruction when said condition is not removed within a specified time period, and for placing said instruction processing unit in a READY state permitting said instruction processing unit to accept new instructions for execution when said condition is removed and no further new instructions await execution; first control means connected to said state generating means and to said functional units:

for suspending the operation of at least some of said plurality of said functional units in assisting execution of said first instruction, in response to said HOLD ON NEW state, for suspending the operation of at least some of said plurality of said functional units in assisting execution of said first instruction, in response to said HOLD ON OLD sate, for suspending the operation of at least some of said plurality of said functional units in assisting execution of said first instruction, in response to said CANCEL state, for restarting the operation of all said functional units in assisting execution of said first instruction, in response to said GO state, and for restarting the operation of all said functional units in assisting execution of said plurality of instructions in response to said READY state; and second control means connected to said functional units for requesting the assistance of at least one of the plurality of functional units in order to complete the execution of said first instruction, wherein the requested functional unit responds by activating a functional unit busy signal or a possible error signal to said instruction processing unit, said functional unit busy signal indicating that the requested functional unit is busy with another operation and said possible error signal indicating that the requested functional unit has an error condition and is attempting to recover from said error condition, wherein said state generating means places said instruction processing unit in said HOLD ON OLD state and holds said instruction processing unit in said HOLD ON OLD sate in response to said functional unit busy signal or said possible error signal until said signal is deactivated, wherein said state generating means is for placing said instruction processing unit in said GO state in response to deactivation of said functional unit busy signal or in response to deactivation of said possible error signal, and wherein said state generating means is for placing said instruction processing unit in said GO state in preparation for execution of a second instruction among said plurality of instructions in response to deactivation of said possible error signal without deactivation of said functional unit busy signal, wherein said second control means is for requesting the assistance of a second functional unit in response to activation of said functional unit busy signal in order to complete the execution of said second instruction, wherein said second functional unit is for activating a unit acknowledge signal to said instruction processing unit in response to deactivation of said active functional unit busy signal, said unit acknowledge signal indicating receipt by said second functional unit of the request for assistance in the execution of said second instruction, and wherein said state generating means is for placing said instruction processing unit in said HOLD ON NEW state with respect to the execution of said second instruction until activation of said unit acknowledge signal from said second functional unit.

2. The instruction processing unit of claim 1 wherein:

said state generating means is for changing said instruction processing unit from said HOLD ON NEW state to said CANCEL state if said unit acknowledge signal is not activated within a predetermined time period; and said state generating means is for changing said instruction processing unit from said HOLD ON NEW state to said GO state in preparation for execution of a third instruction if said unit acknowledge signal is activated within said predetermined time period.

3. In a computer system including an instruction processing unit for attempting an execution of a first instruction among a plurality of instructions, and a plurality of functional units connected to the instruction processing unit for assisting said instruction processing unit in the execution of said first instruction, said instruction processing unit comprising:

condition means connected to said functional units for detecting a condition occurring either prior to or during the attempted execution of said first instruction, said condition preventing the execution of said first instruction;

state generating means connected to said condition means:

for temporarily placing said instruction processing unit in a HOLD ON NEW state preventing said instruction unit from beginning execution of a new unexecuted instruction when said condition occurs prior to presentation of said first instruction to said instruction processing unit, for temporarily placing said instruction processing unit in a HOLD ON OLD state preventing said instruction processing unit form completing execution of a partially executed current instruction when said condition occurs during the execution of said first instruction, for placing said instruction processing unit in a GO state permitting the completion of execution of a partially executed current instruction and the starting of execution of a new, unexpected instruction when said condition is removed and a new instruction awaits execution, for placing said instruction processing unit in a CANCEL state cancelling execution of said first instruction when said condition is not removed within a specified time period, and for placing said instruction processing unit in a READY state permitting said instruction processing unit to accept new instruction for execution when said condition is removed and no further new instructions await execution; first control means connected to said state generating means and to said functional units:

for suspending the operation of at least some of said plurality of said functional units in assisting execution of said first instruction, in response to said HOLD ON NEW state, for suspending the operation of at least some of said plurality of said functional units in assisting execution of said first instruction, in response to said HOLD ON OLD state, for suspending the operation of at least some of said plurality of said functional unit in assisting execution of said first instruction, in response to said CANCEL state, for restarting the operation of all said functional units in assisting execution of said first instruction, in response to said GO state, and for restarting the operation of all said functional units in assisting execution of said plurality of instructions in response to said READY state;

said state generating means including processor controller means for gathering and storing information related to the status of said plurality of functional units, the execution status of previously started instructions, and the source of data operands required to complete the execution of a current instruction; and said processor controller means including sequence control means responsive to the information gathered by said processor controller means for generating one of said READY, Go, HOLD ON NEW, HOLD ON OLD, and CANCEL states, a particular one of said states being generated in accordance with said information gathered by said processor controller means.

4. The instruction processing unit of claim 3, wherein said sequence control means comprises:

instruction register means connected to one of said functional units for storing a new instruction to be executed;

input sampler means connected to said functional units for receiving and storing information from the functional units related to the busy status of said functional units, the error condition status of said functional units, and the status of an acknowledge signal from said functional units;

instruction decode means connected to said instruction register means for decoding the new instruction stored in said instruction register means;

instruction stack means connected to said instruction register means for storing information related to the last few instructions previously executed by said instruction processing unit and for generating a state in accordance with said information stored therein; and sequence logic means connected to the input sampler means, the instruction stack means and the instruction decode means for generating one of said READY, GO, HOLD ON NEW, HOLD ON OLD, and CANCEL states in accordance with said information stored in said input sampler means, the state generated by the instruction stack means, and the decoded information stored in said instruction decode means.

5. In a computer system for processing data, computer system including an instruction processing unit (IPU) which receives and issues instructions for execution and a plurality of functional units connected to the IPU for executing instructions, a method of operating said IPU, said method comprising the steps of:

initially, placing said IPU in a READY state in response to completion of execution of an instruction, said READY state enabling said IPU to receive new instructions for execution;

upon receipt of a new instruction for execution, placing said IPU in a HOLD ON NEW state if operand data required by said new instruction is not available to said functional units, said HOLD ON NEW state preventing said IPU form receiving a new unexecuted instruction for execution; otherwise upon receipt of said new instruction and in response to availability of said operand data, placing said IPU in a GO state permitting said functional units to complete execution of a current instruction and to begin execution of a new, unexecuted instruction;

beginning execution of said new instruction;

providing from said IPU a request to a first functional unit for assistance in executing said new instruction;

upon the receipt by said IPU from said first functional unit of a busy signal indicating non-availability of said first functional unit, placing said IPU in a HOLD ON OLD state preventing completion of execution of a partially executed current instruction;

upon removal of said busy signal, resuming execution of said new instruction and returning said IPU to said GO state;

placing said IPU in said HOLD ON OLD state in response to receipt of a first possible error signal from said first functional unit;

if said first possible error signal is removed within a predetermined time period, placing said IPU in said READY state; otherwise placing said IPU in a CANCEL state, said CANCEL state forcing said functional units to discard the results of the execution of said new instruction; and returning said IPU to said GO state to repeat execution of said new instruction.

* * * * *